(12) United States Patent
Fontaine et al.

(10) Patent No.: US 11,509,514 B2
(45) Date of Patent: *Nov. 22, 2022

(54) APPARATUS AND METHOD FOR REDUCING PEAK TO AVERAGE POWER RATIO IN A SIGNAL

(71) Applicant: INTERDIGITAL MADISON PATENT HOLDINGS, SAS, Paris (FR)

(72) Inventors: Loic Fontaine, Cesson-Sevigne (FR); Anthony Pesin, Cesson Sevigne (FR)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/136,720

(22) Filed: Dec. 29, 2020

(65) Prior Publication Data

US 2021/0119844 A1    Apr. 22, 2021

Related U.S. Application Data

(63) Continuation of application No. 16/713,755, filed on Dec. 13, 2019, now Pat. No. 10,880,144, which is a
(Continued)

(30) Foreign Application Priority Data

Apr. 30, 2015    (EP) .................................... 15305671

(51) Int. Cl.
*H04L 27/34*    (2006.01)
*H04L 27/26*    (2006.01)

(52) U.S. Cl.
CPC ...... *H04L 27/2614* (2013.01); *H04L 27/3411* (2013.01)

(58) Field of Classification Search
CPC .................. H04L 27/2614; H04L 27/3411
See application file for complete search history.

(56) References Cited

U.S. PATENT DOCUMENTS 6,283,373 B1    9/2001    Ohkawa et al.
8,831,117 B2    9/2014    Rao et al.
(Continued)

FOREIGN PATENT DOCUMENTS

CN    1305294 A    7/2001
CN    101155305 A    4/2008
(Continued)

OTHER PUBLICATIONS

DVB Organization: "TM-T0015r14_TM-MIM00018r24150110 DVB Technical Module MIMO Study Mission Report wrm Wcdocx.docx", DVB, Digital Video Broadcasting, C/0 EBU-17a Ancienne Route-CH-1218 Grand Saconnex, Geneva Switzerland, Jan. 10, 2015.

(Continued)

*Primary Examiner* — Syed Haider
(74) *Attorney, Agent, or Firm* — Smadar Gefen

(57) ABSTRACT

A method for processing a stream of data represented by a plurality of symbols associated with a constellation. The method includes applying a symbol constellation extension projection to at least one of the plurality of symbols, the symbol constellation extension projection having an outward angular region, the outward angular region defined by a value of an angle, and the value of the angle equal to or less than an angular distance between two symbols in the constellation. The value of the angle is based on a constellation and a code rate used for encoding and transmitting the stream of data.

17 Claims, 20 Drawing Sheets

Related U.S. Application Data continuation of application No. 16/401,763, filed on May 2, 2019, now Pat. No. 10,554,463, which is a continuation of application No. 15/569,610, filed as application No. PCT/EP2016/059538 on Apr. 28, 2016, now Pat. No. 10,333,756.

(56) References Cited

U.S. PATENT DOCUMENTS

| | | | |
|---|---|---|---|
| 2002/0031190 A1* | 3/2002 | Ophir | H04L 27/3433 714/792 |
| 2002/0051501 A1 | 5/2002 | Demjanenko et al. | |
| 2004/0141458 A1* | 7/2004 | Park | H04L 27/2614 370/208 |
| 2005/0233705 A1 | 10/2005 | Vare et al. | |
| 2006/0084444 A1 | 4/2006 | Kossi et al. | |
| 2007/0092018 A1 | 4/2007 | Fonseka et al. | |
| 2007/0217329 A1* | 9/2007 | Abedi | H04L 27/2614 370/480 |
| 2007/0223365 A1* | 9/2007 | Tsfaty | H04L 9/00 370/208 |
| 2008/0019453 A1* | 1/2008 | Zhao | H04L 27/2623 375/260 |
| 2008/0292010 A1 | 11/2008 | Wemears et al. | |
| 2009/0103646 A1 | 4/2009 | Dowling et al. | |
| 2010/0124293 A1* | 5/2010 | Rajagopal | H04L 27/2613 375/260 |
| 2010/0124296 A1* | 5/2010 | Rajagopal | H04L 25/0226 375/260 |
| 2010/0272195 A1 | 10/2010 | Rao et al. | |
| 2014/0314177 A1 | 10/2014 | Choi et al. | |
| 2015/0121176 A1 | 4/2015 | Myung et al. | |
| 2015/0200797 A1 | 7/2015 | Mccallister et al. | |
| 2015/0319022 A1* | 11/2015 | Dhuness | H04L 27/2649 375/302 |

FOREIGN PATENT DOCUMENTS

| | | |
|---|---|---|
| CN | 101202726 | 6/2008 |
| CN | 102255859 | 11/2011 |
| CN | 102769595 | 11/2012 |
| CN | 103179077 | 6/2013 |
| CN | 103580807 A | 2/2014 |
| CN | 103763256 | 4/2014 |
| CN | 103905368 A | 7/2014 |
| EP | 1 933 517 | 6/2008 |
| EP | 1 990 964 | 11/2008 |
| EP | 2814181 A1 | 12/2014 |
| TW | 201145846 A | 12/2011 |
| TW | 201332318 A | 8/2013 |
| WO | 2008/138796 | 11/2008 |
| WO | 2011/093834 | 8/2011 |
| WO | 2015/027514 | 9/2013 |

OTHER PUBLICATIONS

ETSI-EN-302755-Final-draft-v1.2.1_Digital Video Broadcasting (DVB); Frame structure channel coding and modulation for a second generation digital terrestrial television broadcasting system (DVB-T2) Oct. 2010.

Ismail, "Performance Evaluation of PAPR in OFDM for UMTS-LTE System", 2012 IEEE 23rd International Symposium on Personal, Indoor and Mobile Radio Communications (PIMRC 2012).

Miyauchi et al., "Classification of M-ary QAM Based on Instantaneous Power Moment with Adjustable Median", 2013 IEEE Military Communications Conference, pp. 52-57, (Nov. 18, 2013).

Mouhouche et al.,"High order non-uniform constellations for broadcasting UHDTV," 2014 IEEE Wireless Communications and Networking Conference (WCNC), IEEE, Apr. 6, 2014, pp. 600-605 DOI: 1109/WCNC.2014.6952116 retrieved on Nov. 10, 2014.

Sezginer, "Metric-Based Symbol Predistortion Techniques ___", IEEE Transactions on Wireless Communications, vol. 6, No. 7, pp. 2622-2629, Jul. 2007.

Wang et al: "A novel peak-to-average power ratio reduction method for amplitude phase shift keying", 4 Computing, Communications and it Applications Conference (COMCOMAP), 2013, IEEE, Apr. 1, 2013, pp. 100-104.

* cited by examiner

APPARATUS AND METHOD FOR REDUCING PEAK TO AVERAGE POWER RATIO IN A SIGNAL

CROSS REFERENCE

This application is a continuation of U.S. application Ser. No. 16/713,755 filed Dec. 13, 2019, which is a continuation of U.S. application Ser. No. 16/401,763, filed May 2, 2019, which is a continuation of U.S. application Ser. No. 15/569,610 filed Oct. 26, 2017, which claims the benefit, under 35 U.S.C. Section 365 of International Application PCTEP2016/059538, filed Apr. 28, 2016, which claims priority to EP-EPA 15305671.8, filed Apr. 30, 2015, all of which are herein incorporated by reference in their entirety.

TECHNICAL FIELD OF THE INVENTION

The present disclosure generally relates to communication systems. More particularly, the present disclosure relates to peak to average power ratio reduction techniques used in a communication system.

BACKGROUND OF THE INVENTION

This section is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Many modern communication systems utilize multicarrier modulation techniques, such as Orthogonal Frequency Division Multiplexing (OFDM). OFDM is a technique of encoding digital data on multiple carrier frequencies. In OFDM, the sub-carrier frequencies are chosen so that the sub-carriers are orthogonal to each other, meaning that cross-talk between the sub-channels is eliminated and inter-carrier guard bands are not required. This greatly simplifies the design of both the transmitter and the receiver; unlike conventional frequency division multiplexing (FDM), a separate filter for each sub-channel is not required. The orthogonality allows for efficient modulator and demodulator implementation using the Fast Fourier Transform (FFT) algorithm on the receiver side, and inverse FFT on the transmitter side. In particular, the size of the FFT identifies the number of carriers in the OFDM modulation system. Frequency selective channels are characterized either by their delay spread or coherence bandwidth. In a single carrier system, such as the eight level vestigial sideband (8-VSB) signal transmission system, a single fade or interference can cause the whole link to fail, but in multi-carrier systems, like OFDM, only a few of the total sub carriers will be affected. This way, multipath fading can be easily eliminated in OFDM, with simpler equalization techniques than in single carrier systems. OFDM is used in systems for terrestrial television signal transmission (e.g., digital video broadcast standards DVB-T and DVB-T2) as well as cellular telephone and wireless data signal transmission, among others.

For the DVB-T2 system, there are several different FFT sizes to choose from, specifically, 1K, 2K, 4K, 8K, 16K, and 32K, where the number of carriers is equal to two to the N power that most closely equals the value indicated above in thousands. As the size of the FFT increases, the roll-off of the spectrum gets increasingly sharper. Normally, for each FFT size, only a fixed number of the OFDM carriers are used and at the edges of the spectrum, some of the carriers are not used to allow the spectrum to roll-off enough to not interfere into the adjacent channel. For the large FFT sizes (16K, 32K, etc.), the roll-off is very sharp allowing for some additional OFDM carriers to be utilized. At these higher FFT values, the DVB-T2 specification allows for either the normal number of carriers or an extended number of carriers to be used. This is signaled to the receiver using the L1 pre-signaling data.

Further, each of the carriers may be modulated based on a modulation code word set. The modulation depth or constellation pattern may vary from quadrature phase shift keying (QPSK) using two bit code words to 256 level quadrature amplitude modulation (256-QAM) using 8 bit code words.

OFDM modulation has been adopted for use in digital terrestrial television standards, e.g., the DVB-T/DVB-T2 standards in Europe, and the integrate services digital broadcast standard ISDB-T standard in Japan. DVB-T, the 1st generation of European Digital Terrestrial Television (DTT), is the most widely adopted and deployed standard. Since its publication in 1997, over 70 countries have deployed DVB-T services and 45 more have adopted (but not yet deployed) DVB-T. This well-established standard benefits from massive economies of scale and very low receiver prices. Like its predecessor, DVB-T2 uses OFDM (orthogonal frequency division multiplex) modulation with a large number of sub-carriers delivering a robust signal, and offers a range of different modes, making it a very flexible standard. DVB-T2 uses the same error correction coding as used in the DVB-S2 standard for satellite signals and the DVB-C2 standard for cable signals: Low Density Parity Check (LDPC) coding combined with Bose-Chaudhuri-Hocquengham (BCH) coding, offering a very robust signal. The number of carriers, guard interval sizes and pilot signals can be adjusted, so that the overheads can be optimized for any target transmission channel. DVB-T2 offers more robustness, flexibility and at least 50% more efficiency than any other DTT system. It supports standard definition (SD), high definition (HD), ultra high definition (UHD), mobile TV, or any combination thereof.

OFDM has also been adopted in other wireless communication networks such as, but not limited to, the Institute of Electrical and Electronics Engineers Standard IEEE 802.11 wireless standard, the cellular 3G partnership project long term evolution (3GPP LTE) standard, and the digital audio broadcast (DAB) standard. OFDM has also been used in other wired protocols including, but not limited to, multimedia over cable alliance (MoCA) system for coaxial cable, and the asymmetrical digital subscriber line (ADSL) and very high bit rate DSL (VDSL) system for telephone lines. The attributes and parameters described above also apply equally to these OFDM implementations.

Recently, the Advanced Television Systems Committee (ATSC), which proposes terrestrial broadcasting digital television standards in the U.S., announced a call for proposals for the next generation (named ATSC 3.0) physical layer. ATSC 3.0 will provide even more services to the viewer and increased bandwidth efficiency and compression performance, which requires breaking backwards compatibility with the currently deployed version, ATSC A/53, which comprises an 8-VSB (8 level, Vestigial Sideband) modulation system. ATSC 3.0 is expected to emerge within the next decade and it intends to support delivery to fixed devices of content with video resolutions up to Ultra High Definition having 3840 pixels by 2160 pixels at 60 frames per second (fps). ATSC 3.0 may utilize many of the principles outlined above related to OFDM and may further include a plurality of signal modulation constellation patterns. The intention of the system is to support delivery to portable, handheld and vehicular devices of content with video resolution up to High Definition having 1920 pixels by 1080 pixels at 60 fps. The system is also expected to support lower video resolutions and frame rates.

Despite its competitive attributes, however, OFDM signals have a major disadvantage compared to single carrier signals: a high Peak-to-Average Power Ratio (PAPR). When the OFDM signal is transformed to the time domain, the resulting signal is the sum of all the sub-carriers, which may add up in phase, resulting in a signal peak up to N times higher than the average signal power, where N is the number of sub-carriers. This characteristic leads the OFDM signals to be very sensitive to nonlinearities of analog components of the transceiver, in particular those of the High Power Amplifier (HPA) at the emission.

An HPA is conceived to operate in its saturation zone, which corresponds to its high efficiency region. However, in this zone, the HPA has a severe nonlinear behavior. These nonlinearities are sources of In-Band (IB) distortions which can both degrade the link performance in terms of Bit Error Rate (BER) and also cause significant Out-Of-Band (OOB) interference products that make it harder for the operator to comply with stringent spectral masks. The simplest solution to this problem is to operate the HPA in the linear region by allowing a large enough amplifier back-off. However, this approach degrades the power efficiency of the system and often leads to unacceptable cost-efficiency conditions in the overall system. For all these reasons, reducing the PAPR of OFDM signals is increasingly being considered to be very important in maintaining the cost-effectiveness advantages of OFDM in practical systems, especially as new systems like DVB-T2 are being specified with large numbers of carriers (up to 32K and 256-QAM modulation).

Many techniques have been proposed to reduce PAPR values in OFDM systems, but most of them either reduce the efficiency of the transmission or deliberately degrade the quality of the transmitted signal. For example, an Active Constellation Extension (ACE) mechanism has been proposed as an efficient method to reduce the PAPR values in both single input single output (SISO) and multiple input multiple output (MIMO) communication systems and have also been adopted for use with DVB-T2 broadcast systems. However, these systems are not optimal for all signal modulation constellation patterns. For example, ATSC 3.0 is considering using two dimensional (2D) non-square constellation patterns containing 16, 64, or 256 constellation symbols or points. The ACE mechanism works well with QAM modulated sub-carriers using square constellation because the boundary points of the square QAM constellation are extended following the real or imaginary axis direction. However, the ACE techniques as used with DVB-T2, as well as similar PAPR reduction techniques, have very low efficiency for non-square constellations proposed for ATSC 3.0.

When a new broadcast system is deployed, as it will eventually be the case for ATSC 3.0, the new broadcast system may co-exist with the existing system for some time. In addition, there is usually some channel re-alignment involved where channels are moved around the available spectrum to accommodate both new and existing channels. This planning process can be quite difficult as it must take into account the interference between the various channels when planning where the channels can be located. The co-existence condition highlights the importance of considering PAPR reduction techniques one of the priorities of the new system, particularly because of potential adjacent and co-channel interferences with the pre-existing single carrier system. Therefore, there is a need for an improvement to the PAPR reduction techniques used in conjunction with OFDM systems based on new and different signal modulation constellation patterns, including the OFDM system for ATSC 3.0.

SUMMARY

According to an aspect of the present disclosure, a method processing a stream of data converted into a plurality of symbols in a constellation as part of transmitting a signal is described The method includes applying a symbol constellation extension projection to at least one symbol in the constellation, the symbol constellation extension projection having an outward angular region from an original position for the at least one symbol in the constellation, the outward angular region defined by a value for an angle between a first boundary and a second boundary for the outward angular region, the value for the angle determined by a selection of the constellation used as part of the transmitted signal and a code rate used for encoding the stream of data.

According to another aspect of the present disclosure, an apparatus processing a stream of data converted into a plurality of symbols in a constellation as part of transmitting a signal is described. The apparatus includes a projection module (670), the projection module applying a symbol constellation extension projection to at least one symbol in the constellation, the symbol constellation extension projection having an outward angular region from an original position for the at least one symbol in the constellation, the outward angular region defined by a value for an angle between a first boundary and a second boundary for the outward angular region, the value for the angle determined by a selection of the constellation used as part of the transmitted signal and a code rate for used for encoding the stream of data.

According to a further embodiment, a method for processing a received signal transmitted as a constellation of symbols representing a data stream that has been encoded using a code rate. is described. The method includes demodulating the received signal to provide an estimation of at least one symbol in the transmitted signal on an extended constellation, the extended constellation including at least one extended region formed as an outward angular sector from an original location for a symbol in the constellation, the outward angular region defined by a value for an angle between a first boundary and a second boundary for the outward angular region, the value for the angle determined by a selection of the constellation used as part of the transmitted signal and the code rate for the data stream in the signal.

According to yet another embodiment, an apparatus for processing a received signal transmitted as a constellation of symbols representing a data stream that has been encoded using a code rate is described. The apparatus includes a demodulator that demodulates the received signal to provide an estimation of at least one symbol in the transmitted signal on an extended constellation, the extended constellation including at least one extended region formed as an outward angular sector from an original location for a symbol in the constellation, the outward angular region defined by a value for an angle between a first boundary and a second boundary for the outward angular region, the value for the angle determined by a selection of the constellation used as part of the transmitted signal and the code rate for the data stream in the signal.

The above presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

BRIEF DESCRIPTION OF THE DRAWINGS

These, and other aspects, features and advantages of the present disclosure will be described or become apparent from the following detailed description of the preferred embodiments, which is to be read in connection with the accompanying drawings.

Figure 1:
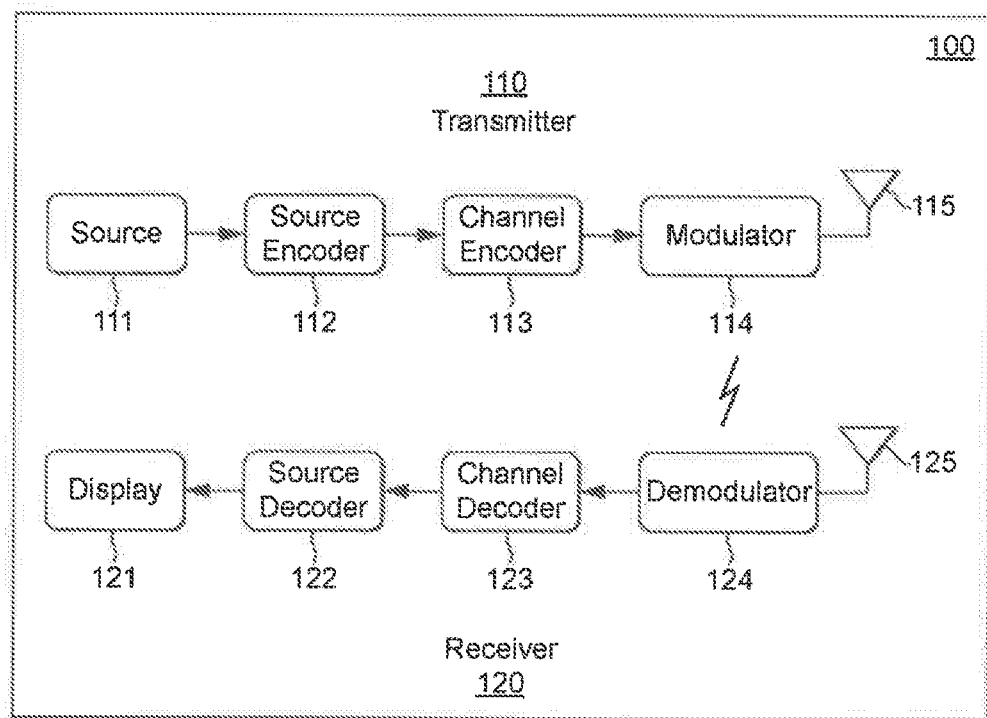
FIG. 1 illustrates a simplified block diagram of a general digital communication system applicable to the digital broadcasting channel according to aspects of the present disclosure.

It should be understood that the drawing(s) are for purposes of illustrating the concepts of the disclosure and is not necessarily the only possible configuration for illustrating the disclosure.

DETAILED DESCRIPTION OF PREFERRED EMBODIMENTS

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Described herein are mechanisms for coding of a stream of input data into a constellation of symbols in order to reduce the PAPR for the signal and also processing those symbols in a receiver to reduce or compensate for the presence of the PAPR reduction in the received signal. The mechanisms include mapping the stream of input data into a set of symbols, applying a constellation extension projection in a constellation to at least one symbol, and modulating the processed symbols to produce a transmitted signal, wherein the processing applies a constellation extension projection to the at least one symbol in an outward angular region, the outward angular region defined by a value for an angle between a first boundary and a second boundary for the outward angular region. The value of the angle is determined through a combination of determining a type of constellation that will be used as well as the signal coding rate that is used for the stream of data. In other words, the angle is dependent on a selection of, or based on, the symbol constellation that is used as part of transmitting the signal. Further, the angle is determined by adjusting the angle based on the amount of forward error correction (FEC) coding that is applied to the signal. The angle determined and used in this manner is more optimal for PAPR reduction as described below. As a result, the value for the angle used to form, or bound, the outward angular region as part of reducing PAPR using an active constellation extension varies depending on the choice of symbol constellation as well as the FEC code rate for the data stream in the signal.

The principles of the present disclosure enables a reduced PAPR in a data transmission over a wireless channel while maintaining reduced complexity in the encoders since the encoding process is not iterative. Reduced complexity is also important in the decoding process, especially when used in a MIMO lattice decoder where the number of dimensions becomes large. The principles may be applied to many systems that are based on multi-carrier transmission. The principles may further be compliant with many decoding methods including Maximum Likelihood (ML) or non ML decoding. The principles are most effective when applied to constellations for the transmitted signal that are non-square. The principles may also be effective when applied to constellations for the transmitted signal that are non-uniform. Furthermore, the principles are compliant to decoding of data transmitted through a Single Input Single Output (SISO), Multiple Input Single Output (MISO), or Multiple Input Multiple Output (MIMO) channel. Further, although the principles are described for constellations having 16, 64, or 256 points, the principles may be applied to constellations having fewer or greater number of points, including, but not limited to 1,024 or 4,096 point constellations.

In the embodiments described herein, certain elements shown in the figures are well known and will not be described in detail. For example, other than the inventive concept, familiarity with PAPR concepts and PAPR reduction techniques is assumed and not described herein in detail. Also, familiarity with the second generation digital terrestrial television broadcasting system for DVB-T2 is assumed and not described herein. In this regard, familiarity with the standards and recommended practices of the European Telecommunications Standards Institute (ETSI) Engineering Norm (EN) 302 755 and ETSI technical standard (TS) 102 832 is assumed and not described herein. Additionally, familiarity with digital terrestrial television broadcasting system for the US, referred to as ATSC, is assumed and not described herein. In this regard, familiarity with the standards and recommended practices of ATSC standards A/53, A/153 and A/54 is assumed. Further, familiarity with other systems that may use OFDM techniques are assumed, including but not limited to wireless data or phone networks and wired networks using a copper or optical physical medium. It should also be noted that the inventive concept may be implemented using conventional programming techniques, which, as such, will not be described herein.

Turning now to FIG. 1, a simplified block diagram of a system 100 of a general digital communication system applicable to the digital broadcasting channel is shown. System 100 is shown as independent of the modulation system and system architecture. System 100 may be used, in whole or in part, as part of a system for DVB-T2 or ATSC, or any other similar digital broadcasting system, for example, a digital terrestrial broadcasting system including transmitter of a digital terrestrial broadcast signal and receiver of a digital terrestrial.

System 100 includes a transmitter 110 connected to a receiver 120. The transmitter 110 includes the following components:
  a source 111 that contains and/or provides audio, video, signaling or control and other ancillary data (e.g., program guide data);
  a source encoder 112, connected to the source 111, including audio and video encoders to compress the audio and video data;
  a channel encoder 113, connected to the source encoder 112, including at least some of the functions of randomizing, interleaving, channel coding and frame mapping to process the compressed, signaling and ancillary digital data for robustness and to add levels of error correcting encoding functionality;
  a modulator 114, connected to the channel encoder 113, that converts the processed digital data into modulation symbols, which can be, for example, VSB (ATSC) or OFDM (DVB-T2). In addition, it includes the functionality of filtering and digital-to-analog (D/A) conversion; and an antenna 115, connected to the modulator 114, that includes the functionalities for up-conversion, RF amplification and over-the-air broadcasting.

Antenna 115 in transmitter 110 radiates a broadcast signal that is received by a receiver device 120.

At the receiver 120, the inverse functions of the transmitter 110 are performed, including the following components:

an antenna/tuner 125, that includes the functionalities of over-the-air reception, RF down-conversion and tuning;

a demodulator 124, connected to antenna/tuner 125, that recovers the digital data from the modulation symbols and includes the functionalities of analog-to-digital conversion (D/A), gain control, carrier and symbol timing recovery, equalization and header or preamble sync detection;

a channel decoder 123, connected to demodulator 124, that recovers the compressed and ancillary data by performing the inverse functionalities of the channel encoder, including error correcting decoding, de-interleaving and de-randomizing;

a source decoder 122, connected to channel decoder 123, that decompresses the audio and video data, including video and audio decoders; and a display device 121, connected to source decoder 122, for audio/video viewing.

A skilled artisan will appreciate that a source encoder 112 and a channel encoder 113, although common in general communications systems, are not essential for a system according to the present principles. Similarly, depending on the transmitter, a source decoder 122 and a channel decoder 123, although common in general communications systems, are not essential for a system according to the present principles. In addition, the transmitter 110 and receiver 120 may not require an antenna, if the transmission system is other than over-the-air (e.g., over cable). Furthermore, some receivers may not include a display 121. It is also important to note that several components and interconnections necessary for complete operation of transmitter 110 and receiver 120 are not shown in the interest of conciseness, as the components not shown are well known to those skilled in the art. Exemplary receivers include, but are not limited to, televisions, set-top boxes, computers, gateways, mobile phones, mobile terminals, automobile radio receivers, and tablets.

Figure 2:
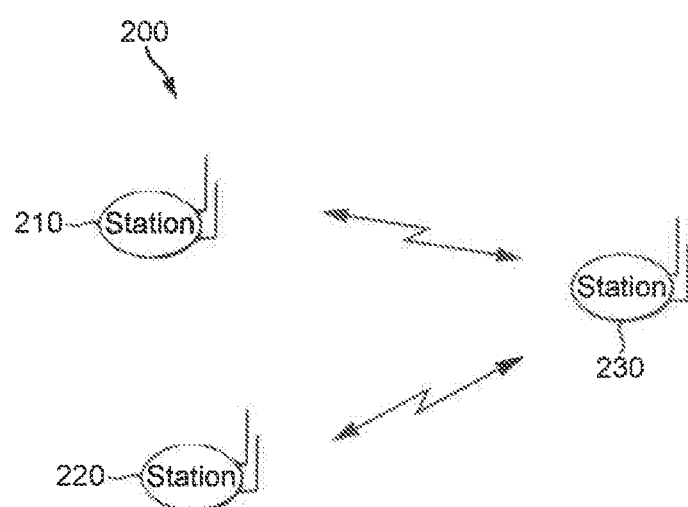
FIG. 2 illustrates a block diagram of an exemplary wireless network according to aspects of the present disclosure.

Turning to FIG. 2, a block diagram of an exemplary wireless network 200 is shown. Wireless network 200 includes two way communication between devices in the network and is shown as independent of the modulation system and system architecture. Wireless system 100 may use elements similar to those described in transmitter 110 and receiver 120 described in FIG. 1. It is also important to note that several components and interconnections necessary for complete operation of wireless network are not shown in the interest of conciseness, as the components not shown are well known to those skilled in the art.

Wireless network 200 includes transceiver stations 210, 220, and 230. Each station 210, 220, and 230 comprises a transmitter and a receiver using a MIMO antenna system. MIMO uses a plurality of antennas in the communication link for receiving and transmitting a signal. Each station may also employ a plurality of transmitter and receiver circuits associated with the plurality of antennas. Discussion of an exemplary MIMO transmitter and receiver circuit will be described in detail below. Station 230 communicates using MIMO with stations 210 and 220 through a wireless link.

Figure 3:
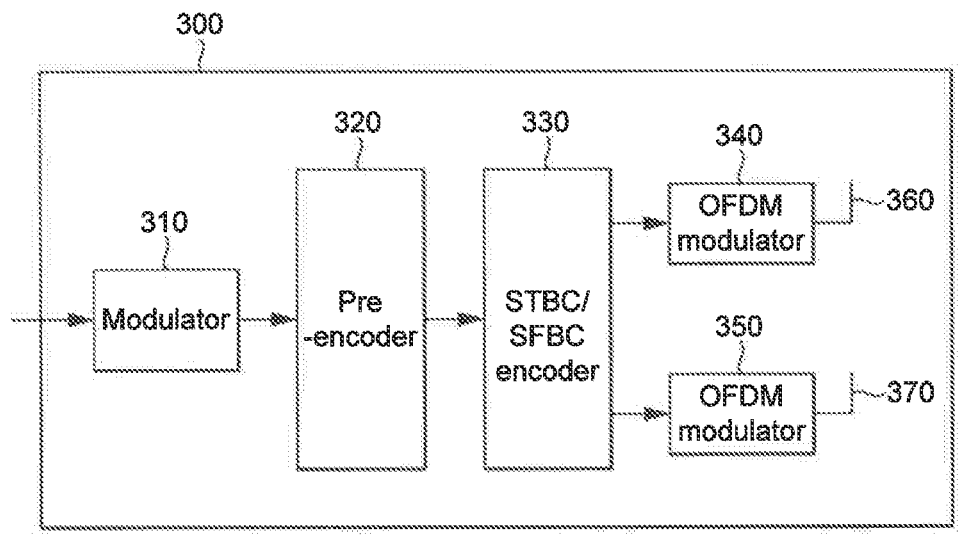
FIG. 3 illustrates a block diagram of an exemplary transmitter source according to aspects of the present disclosure.

Turning now to FIG. 3, a block diagram of an exemplary data transmitter 300 capable of sending data in accordance with the principles of the present disclosure is shown. Data transmitter 300 may be implemented as part of stations 210, 220, and 230 in order to communicate using MIMO techniques described in FIG. 2. Further, portions of data transmitter 300 may be incorporated into transmitter 110 described in FIG. 1. It is also important to note that several components and interconnections necessary for complete operation of transmitter 300 are not shown in the interest of conciseness, as the components not shown are well known to those skilled in the art.

The data transmitter 300 includes the following components:

a modulator 310 that receives an input data stream;

a pre-encoder 320 coupled to modulator 310;

a Space Time Block Code (STBC)/Space Frequency Block Code (SFBC) encoder 330 coupled to pre-encoder 320;

OFDM modulators 340 and 350 each coupled to STBC/SFBC encoder 330; and antennas 360 and 370, each being associated and coupled to an OFDM modulator 340 and 350 respectively.

It is important to note that in the present embodiment antennas 360 and 370 are considered as including Radio Frequency (RF) circuitry, such as frequency transposition, power amplification and filtering. Advantageously, antennas 360 and 370 include a linearised HPA that is designed to mitigate distortion of the transmitted signal. Other embodiments may include RF circuitry separate from the antennas. Further, data transmitter 300 shows only two OFDM modulators and antennas, however, other embodiments may include more than two and still other embodiments, such as those intended for single input single output (SISO) operation, may include only one.

The data transmitter 300 receives a binary signal as part of a data stream. The binary signal is digitally modulated by the modulator 310 using a first modulation format (e.g., 16QAM or 64QAM). The modulator 310 generates groups of complex QAM symbols. The number of complex QAM symbols in each group may, for example, be equal to 1024 and equals the product of the STBC/SFBC rate by the numbers of transmit antennas, identified as Ntx (e.g., two), and by the number of subcarriers. In one embodiment, the code rate is equal to one, Ntx equals two and the number of subcarriers equals 512.

Each group of complex QAM symbols may be pre-encoded according to principles of the present disclosure. In one embodiment, pre-encoding may further include performing a transform on the group of QAM symbols, as a stream of data, to convert the group of QAM symbols to a transform or time domain signal. The amplitude of the transform domain signal is limited to produce a clipped transform signal. An inverse transform is performed on the clipped transform signal to an inverse transform or frequency domain signal again. The values or signal levels for the original stream of data, or group of QAM symbols, are subtracted from the values or signal levels for the stream of data from the inverse transform signal to produce a remainder signal. The signal level of the remainder signal is adjusted, or multiplied by a pre-determined factor (e.g., a gain value K) to produce an adjusted remainder signal. The values or signal levels for the original stream of data, or group of QAM symbols are added to the values or signal levels for the adjusted remainder signal to produce an error signal. The error signal is used as part of a constellation projection mapping for the original group of QAM symbols. Other embodiments employing other pre-encoding techniques may be used in place of the techniques described here. Details of pre-encoding techniques will be described in further detail below.

After pre-encoding, each group of encoded symbols is further encoded to form a STBC/SFBC codeword STBC/SFBC encoder 330. The STBC/SFBC codeword may be one of several known codeword structures. The STBC/SFBC codeword is typically based on a complex matrix of dimension $N_{tx}*N$ where N is the time dimension of the STBC/SFBC. In one embodiment, a codeword set known as Golden code may be used.

At the output of STBC/SFBC encoder 330, the generated signal has been mapped in a time/frequency mapping that provides a dedicated signal to each of OFDM modulator 340 and 350. Each modulator 340 and 350 modulates the respective input signal into an OFDM modulated signal that is sent on antennas 360 and 370 (after possibly filtering, frequency transposition and amplification as usually done in a radio transmitted signal). As a result, the information data received at the input of data transmitter 300 is sent on a MIMO channel to a receiver in another device. According to present principles of the disclosure, the data may be sent with a reduced PAPR using the embodiments described below.

Although FIG. 3 describes modulation using QAM, other modulation arrangements are possible. The first modulation in modulator 310 may be of any digital modulation, such as nPSK (i.e., PSK with n phase values) or nQAM (i.e., QAM with n equals to 16, 32, 64, 256 . . . ) and may include non-square constellation patterns.

Figure 4:
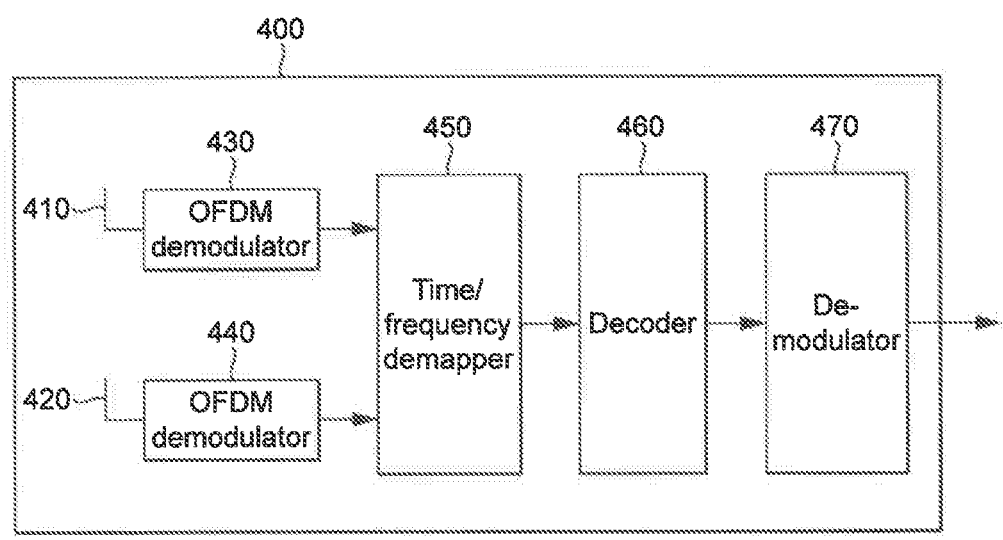
FIG. 4 illustrates a block diagram of an exemplary data receiver according to aspects of the present disclosure.

Turning to FIG. 4, a block diagram of an exemplary data receiver 400 capable of receiving data in accordance with the principles of the present disclosure is shown. Data receiver 400 receives a signal send by a transmitter, such as data transmitter 300, through a wireless channel. This channel is noisy and comprises Additive White Gaussian Noise (AWGN) and possibly other noise, such as environmental interference. The sent signal in the channel may also be affected by multipath echoes and/or doppler effect. Data receiver 400 may be implemented as part of stations 210, 220, and 230 in order to communicate using MIMO techniques described in FIG. 2. Further, portions of data receiver 400 may be incorporated into receiver 120 described in FIG. 1. It is also important to note that several components and interconnections necessary for complete operation of data receiver 400 are not shown in the interest of conciseness, as the components not shown are well known to those skilled in the art.

The data receiver 400 includes the following components:
antennas 410 and 420 that receive the transmitted signal;
OFDM demodulators 430 and 440 associated and coupled to antennas 410 and 410 respectively and each demodulating a noisy OFDM modulated signal received by antennas 410 and 420;
a time/frequency demapper 450 coupled to both OFDM demodulator 430 and OFDM demodulator 440;
a decoder 460 coupled to time/frequency demapper 450; and
a demodulator 470 coupled to decoder 460 and providing a data stream of information bits for further processing in a device.

The operation of data receiver 400 is intended for reception, demodulation, and decoding of a signal provided by a transmitter, such as data transmitter 300 described in FIG. 3, especially with respect to modulation and coding used as part of the signal transmission. Data receiver 400 comprises receive antennas 410 and 420 so that the received signal may be represented by a matrix that is two by two. As an extension for a set of antennas Nrx, the received signal may be represented by an Nrx*N matrix or equivalently a (Nrx*N)*1 vector R. N is, for instance, equal to two in the present embodiment, and represents the time and/or frequency range occupied by the STBC.

The transmission between the pre-encoder 320 and decoder 460 can be modeled by the following equation:

$$R = \underbrace{\begin{pmatrix} H_1 & 0 & \cdots & 0 \\ 0 & H_2 & \ddots & \vdots \\ \vdots & \ddots & \ddots & 0 \\ 0 & \cdots & 0 & H_N \end{pmatrix}}_{G} CS + v = GS + v \quad \text{(equation 1)}$$

Where the different parameters are as follows:
R is the complex (Nrx*N)*1 received vector;
$H_i$ is the complex Nrx*Ntx channel matrix at time/frequency interval i (frequency corresponds to a carrier of the multicarrier modulation; according to a variant using a single carrier modulation the interval i corresponds to a time interval);
H=diag($H_1$, . . . , $H_N$) is the complex block diagonal (N*Nrx)*(N*Ntx) channel matrix at time/frequency intervals 1 to N;
C is the complex (Ntx*N)*Q STBC/SFBC coding matrix (e.g. Q=4 or 8), where Q is the number of input complex symbols per STBC/SFBC codeword;
S is the complex Q*1 input vector of extended modulated symbols (after pre-encoding). CS in equation (1) denotes the STB encoded signal. The encoding process is represented by complex matrix multiplications;
v is the complex (N*Nrx)*1 Additive White Gaussian Noise (or AWGN) vector with autocorrelation matrix $R_v = \sigma^2 I_{NNrx}$, where $I_{NNrx}$ is the identity matrix of size (N*Nrx)*(N*Nrx) and $\sigma^2$ represents the variance of the AWGN.

According to a variant, the space/time coding process takes place with real inputs instead of complex inputs. In this variant, the C matrix is a real matrix with a dimension (2Ntx*N)*(2Q).

When the additive noise and interferences corrupting the received signal is not white, a whitening filter is advantageously implemented before the decoder 460. $\sigma^2$ represents the variance of the resulting whitened noise.

The time/frequency demapper 450 receives the OFDM demodulated signals from OFDM demodulators 430 and 440 and is doing the reverse mapping (corresponding to dual operation of pre-encoder 330 in FIG. 3). Time/frequency demapper 450 provides a demapped signal to decoder 460.

The decoder 460 may be any decoder adapted to decode a signal that is based on a coding such as implemented in a MIMO transmitter, such as data transmitter 300 described in FIG. 3. According to a specific embodiment, the decoder 460 is a lattice decoder and is particularly well suited to perform ML decoding of the STBC/SFBC encoded signal.

Advantageously, the decoder 460 is adapted to take into account the specific characteristics and attributes of the pre-encoder 330 in FIG. 3, and especially of a projection of the characteristics or attributes across a constellation change. For example, if the signal provided to the OFDM modulators 340 and 350 in FIG. 3 correspond to a signal with a first constellation that is different than a second constellation used by the modulator 310, then the decoder 460 is adapted to decode a received signal corresponding to the first constellation.

The decoder 460 sends a decoded signal to demodulator 470. The demodulator 470 demodulates the decoded signal according to the mapping associated to the second constellation and provides a demodulated signal (e.g. a series or stream of bits). In other terms, the demodulator 470 associates a symbol of the second constellation to a decoded signal.

Figure 5:
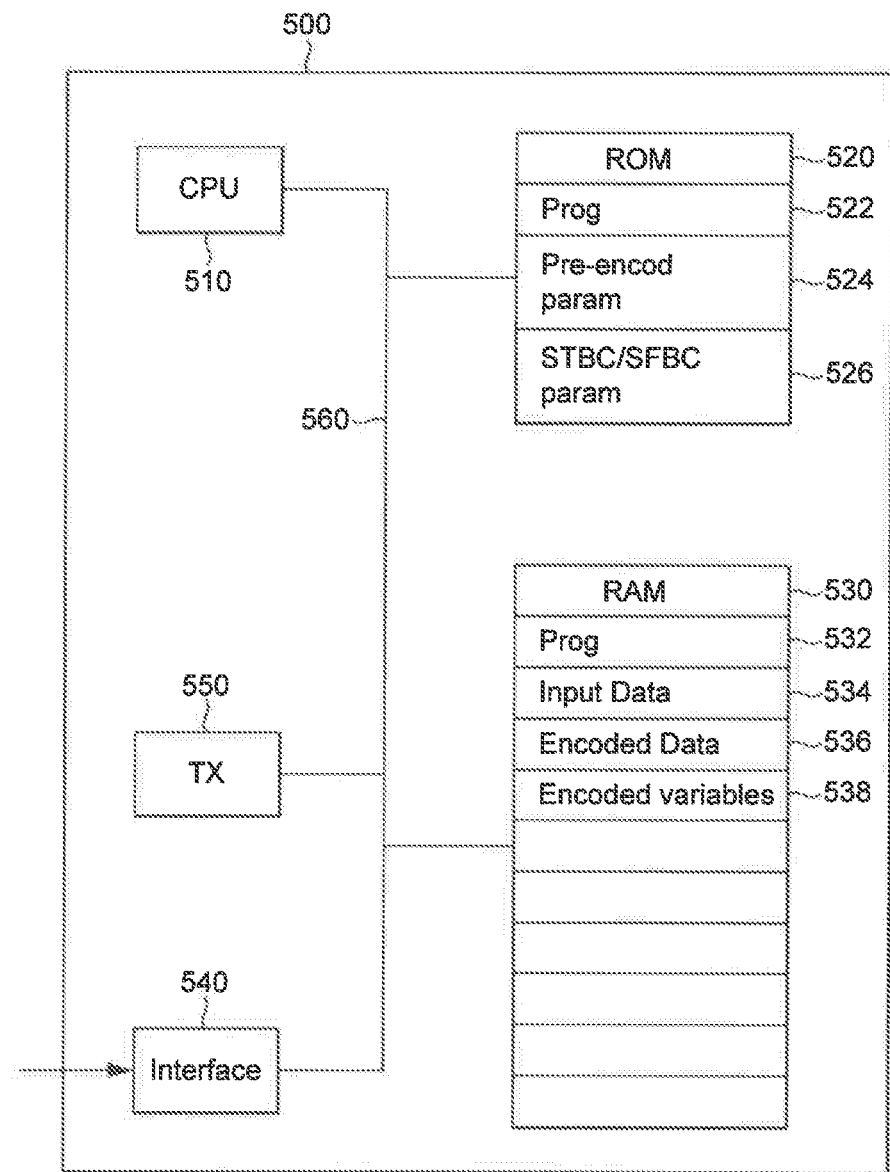
FIG. 5 illustrates a block diagram of another exemplary data transmitter according to aspects of the present disclosure.

Turning now to FIG. 5, a block diagram of another exemplary data transmitter 500 capable of sending data in accordance with the principles of the present disclosure is shown. Data transmitter 500 may incorporate some or all of the elements of data transmitter 300 described in FIG. 3. Data transmitter 500 may further be implemented as part of stations 210, 220, and 230 in order to communicate using MIMO techniques described in FIG. 2. Further, portions of data transmitter 300 may be incorporated into transmitter 110 described in FIG. 1. It is also important to note that several components and interconnections necessary for complete operation of data transmitter 500 are not shown in the interest of conciseness, as the components not shown are well known to those skilled in the art.

Data transmitter 500 comprises the following elements that are linked together by a data and address bus 560:
- a central processing unit (CPU) 510, which is, for example, a microprocessor or a Digital Signal Processor (DSP);
- a ROM 520 containing individual memory sections 522-526;
- a RAM 530 containing individual memory section 532-538;
- an interface 540 that receives data from an application or source prior to transmission; and
- a transmission module 550 that transmits the data as an output signal on a wireless channel, the transmission module 550 including RF circuitry and antennas.

The functional aspects of elements 510, 520, and 530 are well known by those skilled in the art and won't be disclosed further here. The functional aspects of elements 540 and 550 are similar to those described above in either FIG. 1 or FIG. 3 and won't be described further here.

In ROM 520 and RAM 530, the memory sections may correspond to an area of small capacity (some bits) or to a very large area (e.g. a whole program or large amount of received or decoded data).

ROM 520 includes the following components:
- a program section 522;
- pre-encoder parameters section 524 (e.g., clipping parameters, pre-filtering parameters and channel cancellation parameters); and
- STBC/SFBC parameters section 526 (e.g., STBC/SFBC code, number of antennas).

Algorithm information, code, and/or software instructions related to the encoding and transmission method according to the present disclosure are stored in ROM 520. When switched on, the CPU 510 uploads the program from section 522 into RAM 530 and executes the corresponding instructions.

RAM 530 comprises:
- section 532 including memory space to hold the program executed by the CPU 510 and uploaded after switching on data transmitter 500;
- section 534 including memory space to hold input data;
- section 536 including memory space to hold encoded data in different during the encoding process; and
- section 538 including memory space to hold other variables used for encoding.

According to one embodiment, data transmitter 500 is implemented in a pure hardware configuration in one or several floating point gate arrays (FPGA), application specific integrated circuit (ASIC) or very large scale integration (VLSI) circuits with corresponding memory. In another embodiment, data transmitter 500 is implemented using both VLSI circuits with memory and DSP code.

Figure 6:
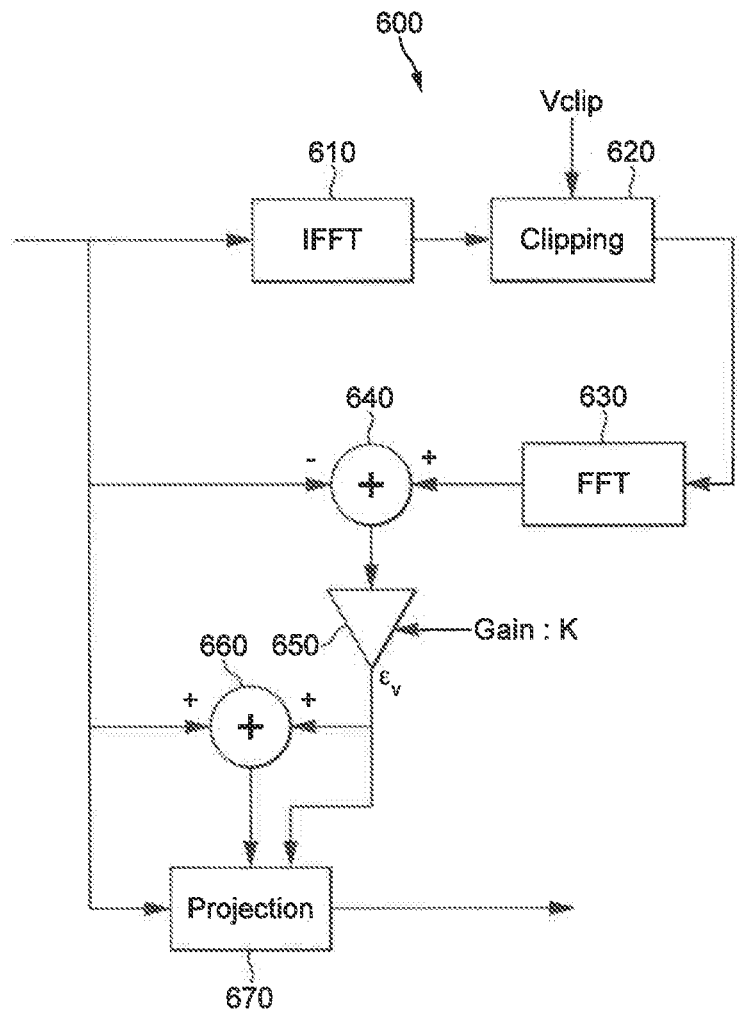
FIG. 6 illustrates a block diagram of an exemplary pre-encoder used in a data transmitter according to aspects of the present disclosure.

Turning to FIG. 6, a block diagram of an exemplary pre-encoder 600 according to aspects of the present disclosure is shown. Pre-encoder operates in a manner similar to pre-encoder 320 in FIG. 3. Pre-encoder 600 may further be used as part of a broadcast transmitter, such as transmitter 110 described in FIG. 1.

The pre-encoder 600 includes the following components:
- an IFFT block 610 that receives a frequency domain multicarrier modulated signal from a modulator circuit (e.g., modulator 310 in FIG. 3) and performs an inverse FFT on the signal;
- a clipping block 620 coupled to the IFFT block 610 that clips the level of the signal based on an additional signal labeled Vclip applied to clipping block 620;
- an FFT Block 630 coupled to the clipping block that performs an FFT on the signal following clipping in the clipping block;
- a subtractor 640 coupled to the FFT block 630 and also receiving the frequency domain multicarrier modulated signal as a second input, the subtractor 640 subtracting the frequency domain multicarrier modulated signal from the clipped signal to generate a correction vector;
- a multiplier 650 coupled to the subtractor 640 that amplifies the correction vector by a gain value equal to K as an input to multiplier 650 to generate a gain adjusted correction vector, also referred to as an error vector;
- an adder 660 coupled to the multiplier 650 and also receiving the frequency domain multicarrier modulated signal as a second input, the adder 660 adding the frequency domain multicarrier modulated signal to the error vector to generate a projection vector; and
- a projection block 670 coupled to the adder 660 and also receiving the frequency domain multicarrier modulated signal and using the error vector from multiplier 650 as inputs, the projection block 670 generates a new projected frequency domain multicarrier modulated signal, also referred to as a reduced PAPR frequency domain multicarrier modulated signal.

Pre-encoder 600 operates and processes the frequency domain multicarrier modulated signal as a series of symbols. One multicarrier symbol in the frequency domain with complex QAM values of each subcarrier is processed in IFFT block 610 to obtain its time domain signal representation. The IFFT block 610 may compute a representation that has been oversampled with respect to the time domain in order to increase the performance or resolution of the further processing.

The time domain representation of the symbol is clipped in the clipping block 620. Clipping is often referred to as limiting and involves preventing the level, or value, of the signal or symbol from exceeding a fixed value. The clipping block 620 uses a signal Vclip as an input for the fixed value. In some embodiments, the signal Vclip may be constant and not adjustable, but in other embodiments, the signal Vclip may be adjustable and further dynamically adjustable. The clipping block 620 may use a transfer function that includes a soft limiter function or, alternatively, a smooth compression function. Exemplary compression functions may include, but is not limited to, hyperbolic tangent, A-Law or μ-Law companding functions similar to those used in telephone systems.

The clipped symbol from clipping block 620 is converted back from a time domain representation of the symbol to a frequency domain representation of the symbol using FFT block 630, similar to the original input symbol. The multi-carrier QAM modulated original multicarrier symbol is compared to the clipped symbol using subtractor 640 to generate a correction vector for the symbol. Although not shown, a buffer circuit may be necessary in order to synchronize the original multicarrier symbol with the clipped symbol at the input of subtractor 640.

The correction vector for the symbol is multiplied by a fixed gain value K in multiplier 650. The gain corrected vector for the symbol is added back into the original symbol to generate a projection vector for the symbol. It is important to note that the correction vector from subtractor 640 represents the extent to which the original symbol has been clipped or limited as a value. This clipped region for the symbol is amplified to accentuate the clipping region in multiplier 650 and added back with the original symbol in adder 660, resulting in exaggerated constellation projection for the symbol.

The resulting constellation projection for the symbol is further processed in projection block 670 using an allowed extended constellation mask in conjunction with the error vector for the symbol and the original constellation projection for the symbol. Each point of the constellation may be associated to an extension mask. In one embodiment, only the outer points of the constellation are associated with an extension mask. The extension mask represents a region in which a constellation point may be projected without obscuring its original symbol location, and its symbol value, within the constellation. In some instances, the extension mask may represent a line. In other instances, the extension mask may represent a region. Further details regarding constellation point projections and extension masks will be described below.

It is important to note that, for QAM constellations that are square, the real and imaginary components of the complex QAM values, or symbol locations, may be processed separately as scalar values. As a result, an extension mask associated with a square QAM constellation will represent a line or series of lines in an x axis direction and/or a y axis direction.

The output time domain OFDM signal is obtained using an OFDM modulator, such as modulator 114 in FIG. 1 or OFDM modulators 340 and 350 in FIG. 3. The OFDM modulator uses the real and imaginary output signals, representing a reduced PAPR frequency domain signal, from projection block 670. It is important to note that, in some embodiments, the real and imaginary output signals may be combined to form a single vector signal.

Figure 7:
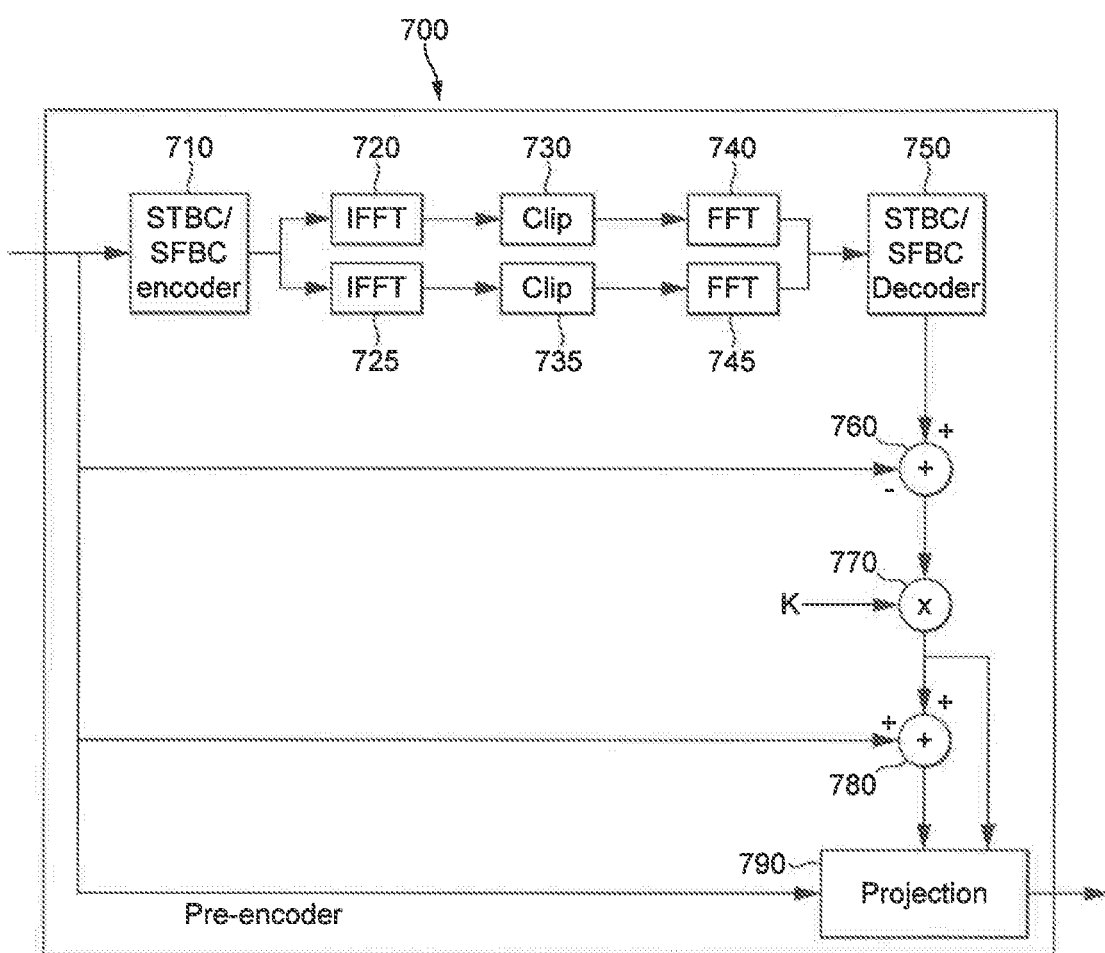
FIG. 7 illustrates a block diagram of another exemplary pre-encoder used in a data transmitter according to aspects of the present disclosure.

Turning now to FIG. 7, a block diagram of another exemplary pre-encoder 700 according to aspects of the present disclosure is shown. Pre-encoder 700 is intended for use in a transmitter employing MIMO techniques or using a plurality of modulation transmission circuits and antennas, such as transmitter 300 described in FIG. 3. Specifically, pre-encoder 700 operates in a manner similar to pre-encoder 320. Pre-encoder 700 will be described based on a MIMO dimension equal to two, using two modulation circuits.

The pre-encoder 700 includes the following components:
an STBC/SFBC encoder 710 that receives complex symbol data and provides encoded complex symbols, the symbols typically arranged in groups;
IFFT blocks 720 and 725 that perform an inverse FFT on the encoded complex symbols;
clipping blocks 730 and 735 coupled to the IFFT blocks 720 and 725 respectively that clip the level of the signal based on an additional signal or threshold level applied to clipping blocks 730 and 735;
FFT blocks 740 and 745 coupled to clipping blocks 730 and 735 respectively that perform an FFT on the signal following clipping in clipping blocks 730 and 735;
an STBC/SFBC decoder 750 coupled to both FFT block 740 and FFT block 745 that receives the complex FFT symbols and decodes the symbols to produce complex symbol data to be processed;
a subtractor 760 that subtracts the originally provided complex symbol data from the output of the STBC/SFBC decoder 750;
a multiplier 770 that multiplies the result of the subtraction in subtractor 760 by a predetermined gain value equal to K;
an adder 780 that adds the result of the multiplication made by multiplier 770 to the originally provided complex symbol data; and
a projection block 790 that processes the result of the addition made by the adder 780 to produce a projection onto a constellation and provides the result of the projection for further processing.

In operation, an input signal that has been modulated or processed using digital modulation (e.g., QAM modulation) and mapped into a series of symbols, is provided to STBC/SFBC encoder 710. The symbols may be grouped and encoded by STBC/SFBC encoder 710 to form a STBC/SFBC codeword in a manner similar to that described earlier in FIG. 3. The individual groups of codewords are provided to IFFT blocks 720 and 725. The time domain signal is first obtained in IFFT blocks 720 and 725. The IFFT blocks 720 and 725 may compute an oversampled version of the time domain signal to increase the performances (especially to improve peak localization after IFFT processing and avoid peak regrowth in digital/analog conversion). According to a variant of the present disclosure, no oversampled version of the time domain signal is computed.

Time domain signals from IFFT blocks 720 and 725 is clipped, or compressed in amplitude, in clipping blocks 730 and 735 based on a threshold. In one embodiment, clipping blocks 730 and 735 may use a fixed threshold. In other embodiments, the threshold may be adjustable and further dynamically adjustable. Further processing in FFT blocks 740 and 745 returns the signal to the frequency domain. The FFT blocks 740 and 745 operate in a manner to reverse the processing of IFFT blocks 720 and 725, including any signal resampling as necessary. STBC/SFBC decoding is applied to the frequency domain clipped signals from each of the FFT blocks 740 and 745 in the STBC/SFBC decoder 750. The decoding in STBC/SFBC decoder is intended to reverse the processing performed in STBC/SFBC encoder 710.

Except as described below, the operation of the remaining blocks in pre-encoder 700 operate in a manner similar to subtractor 640, multiplier 650, adder 660, and projection block 670 described in FIG. 6 and will not be described in further detail here.

In some embodiments using either pre-encoder 600 or pre-encoder 700, some parts of the signal may not be modified using the pre-encoding processing techniques. These parts may include, but are not limited to, reference or pilot signals, such as scattered or continuous pilot signals used for channel estimation. For these parts of the signal, the correction signal may be set to zero. The operation may be carried out as part of the subtractor (e.g., subtractor 640 or subtractor 760). The operation may also be carried out as part of the multiplier (e.g., multiplier 650 or multiplier 770) by setting the gain value K equal to zero for these parts of the signal. The operation may further be carried out in the projection block (e.g., projection block 670 or projection block 790) by preventing a projection change in position for the symbol(s).

In some embodiments, variable and different values for gain value may be applied as separate values Ki to each individual carrier, symbol, or portion of the signal. The values for Ki may be determined based on the transmitted values. Alternatively, the values for Ki may be obtained through a digital optimization algorithm. Ki values may be dependent on the number or carriers, the modulation, the definition of the extended constellation, the PAPR target, and/or the possible increase of power transmission. Different values for Ki may be generated based on the number of carriers in order to balance the distortions of power of the spectrum as a result of clipping. For example, a signal using 1705 modulated carriers using 64 QAM constellation extended to constellation extension value of 81 to achieve the desired value of PAPR, a Ki value for all portions of the signal equal to 15 may be used. Advantageously, Ki values in the range between 10 and 25 may be used depending on the allowed power increase and desired PAPR.

In one embodiment using pre-encoder 600 or pre-encoder 700, a non null value for Ki is applied to all symbols associated with modulated carriers. Any symbols associated with carriers that are non-modulated carriers (i.e., carriers not used to transmit data) are reset to zero after the pre-encoding process. According to a variant, all or some of symbols associated with non-modulated carriers are multiplied by a non null value for Ki in the multiplier (e.g., multiplier 650 or multiplier 770) and left unmodified by the projection block (e.g., projection block 670 or projection block 790).

Figure 8:
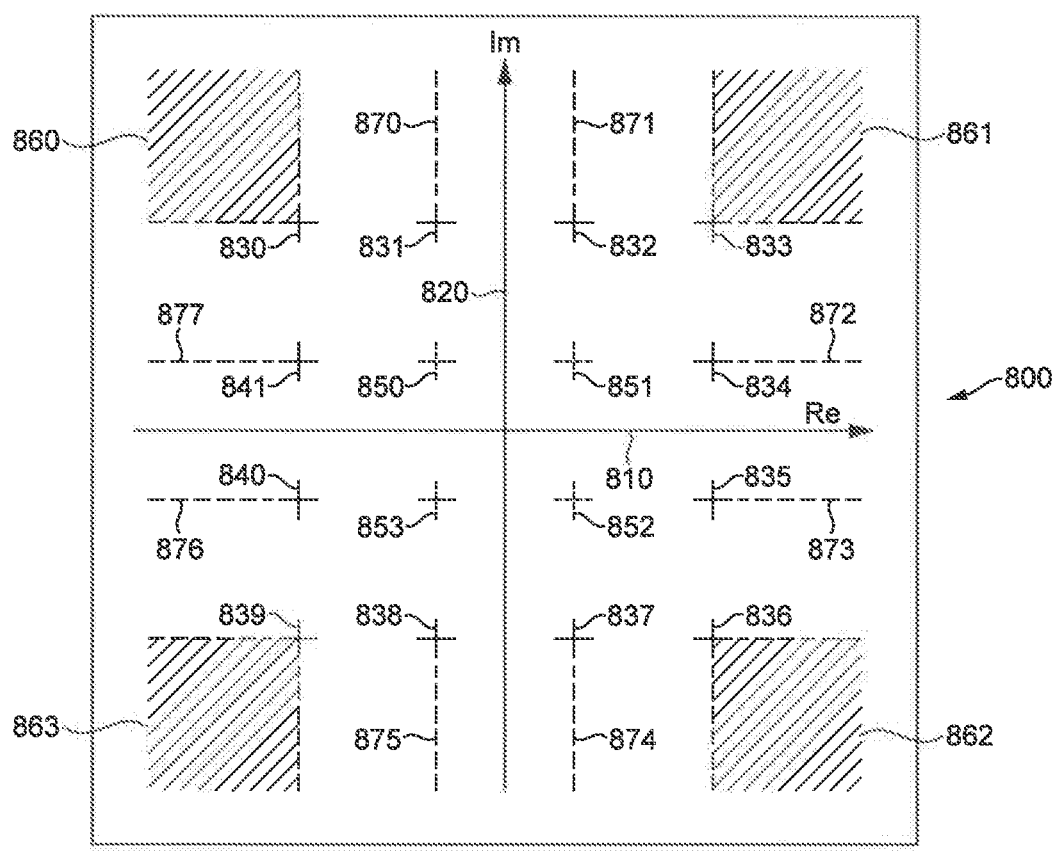
FIG. 8 shows a diagram for a 16-QAM square constellation applying PAPR techniques according to aspects of the present disclosure.

As described earlier, previous PAPR techniques using a pre-encoder similar to that described here in FIG. 6 or FIG. 7 have been configured for processing symbols that use a square constellation, such as a 16-QAM square constellation. FIG. 8 shows a diagram 800 for a 16-QAM square constellation. The constellation is projected with symbol points oriented along a real axis 810 and an imaginary axis 820.

Only the boundary points of the constellation, points 830-841, are shown extended using the PAPR techniques such as those described for pre-encoder 600 in FIG. 6 and pre-encoder 700 in FIG. 7. Further, the four corner points, points 830, 833, 836, and 839 may be extended to anywhere within the hatched areas 860-863 respectively. It is important to note that hatched areas 860-863 are square or rectangular in nature and may be projected using simple scalar values in either real or imaginary axis projection. The other boundary points, 831-832, 834-835, 837-838, and 840-841 may only be extended following the line segments 870-877, starting at the point and extending along the real or imaginary direction toward the outside of the constellation. If any other projection for these boundary points occurs, a potential decoding error may result due to improper symbol decoding. The projection extension region is also limited by an upper bound. The upper may be determined or defined by parameters associated with the signal transmission equipment (e.g., performance specifications for circuitry in antenna 125 described in FIG. 1 or circuit in antennas 360 and 370 described in FIG. 3). The projection extension, as shown here in FIG. 7, as well as the extensions shown below, may also be referred to as a discrete constellation extension.

The four inner points, 850-853, are shown as unaffected or not re-projected by the PAPR techniques.

The technique applied in FIG. 8 and implemented in diagram 800 as part of a pre-encoder 600 or pre-encoder 700 is commonly called "Active Constellation Extension" (ACE) and has been used in the DVB-T2 standard EN 302 755. The technique is used with QAM modulated carriers using square constellation patterns because the boundary points of the square QAM constellation are extended following the real or imaginary axis direction.

Figure 9:
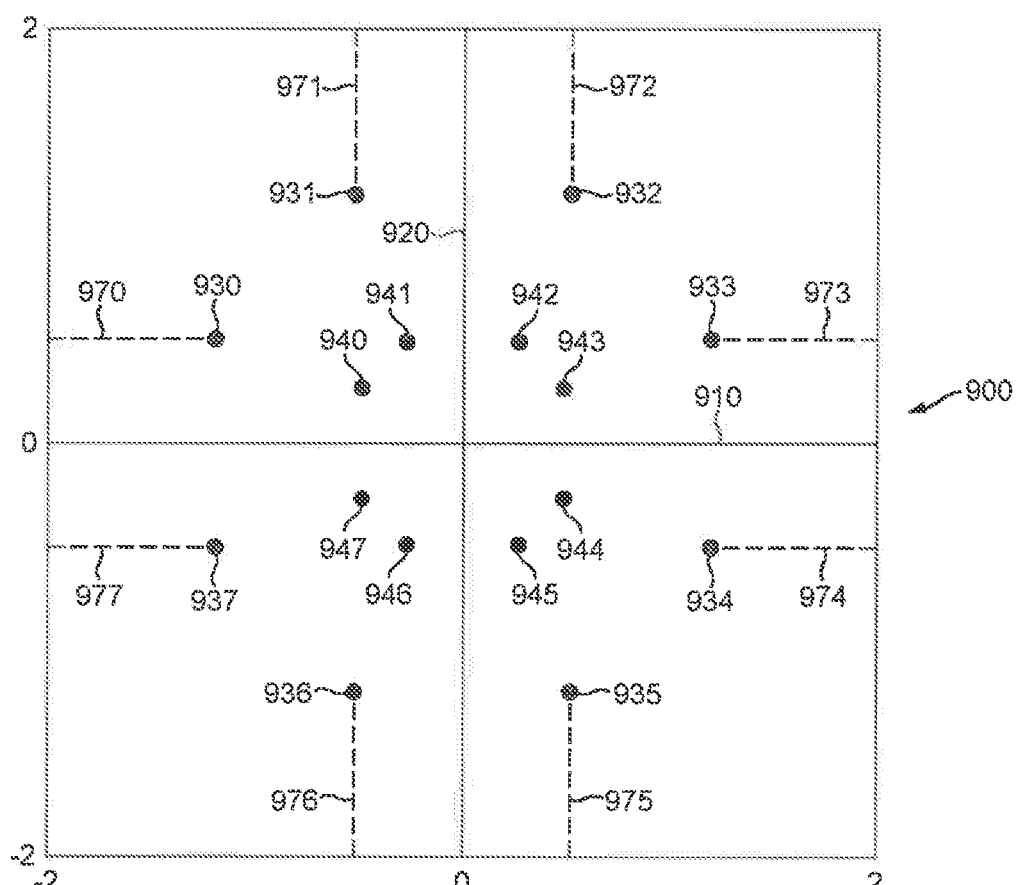
FIG. 9 shows a diagram for a 16-QAM non-square constellation applying PAPR techniques according to aspects of the present disclosure.

The constellation extension and projection techniques using scalar projections, such as shown in diagram 800, are less efficient when used with non-square constellations. FIG. 9 shows a diagram 900 for a 16-QAM non-square constellation with the constellation extension and projection techniques applied in a manner similar to diagram 800. The constellation is projected with symbol points oriented along a real axis 910 and an imaginary axis 920.

Diagram 900 includes outer constellation points 930-937 and inner points 940-947. As in diagram 800, points 940-947 shown in diagram 900 are not affected by the constellation extension projection techniques. Diagram 900 includes an extension projection mask shown as dashed lines. The extension region is limited to only 8 lines, shown as 970-977 for this type of constellation. Due to relative position of constellation points 930-937, the extension regions are reduced compared to regions or mask for a square 16-QAM constellation. Any change in the extension regions shown in diagram 900 is not possible without creating unnecessary symbol errors.

Figure 10:
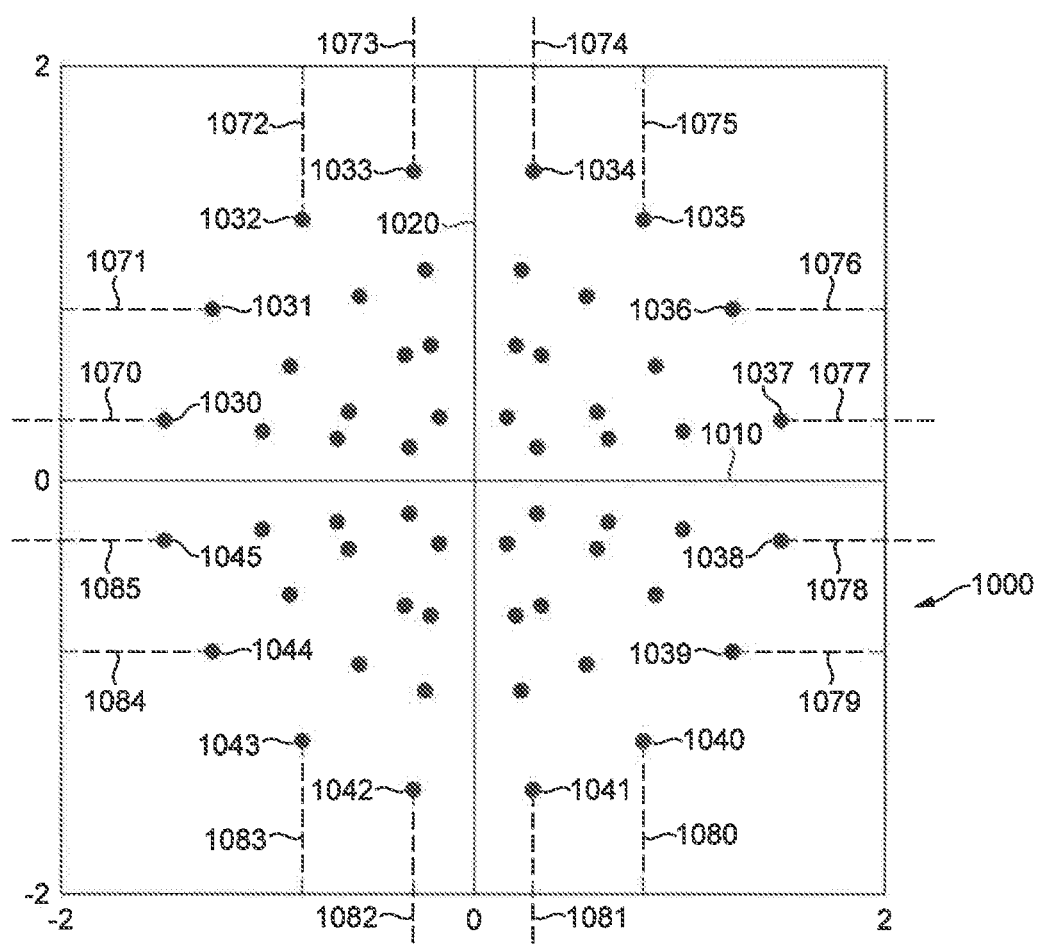
FIG. 10 shows a diagram for a 64-QAM non-square constellation applying PAPR techniques according to aspects of the present disclosure.

The issues with scalar constellation extension and projection techniques are further accentuated with higher order constellations. FIG. 10 shows a diagram 1000 for a 64-QAM non-square constellation with the constellation extension projection techniques applied in a manner similar to diagram 800. The constellation is projected with symbol points oriented along a real axis 1010 and an imaginary axis 1020.

Diagram 1000 includes outer constellation points 1030-1045. As in diagram 900, the remaining inner points, shown here not labeled, are not affected by the constellation extension projection techniques. Diagram 1000 includes extension projection mask shown as dashed lines 1070-1085. The extended region is limited to only 16 lines for this constellation. Due to relative position of constellation points 1030-1045, the extension regions are reduced compared to a square 64-QAM constellation and cannot be expanded without creating unnecessary symbol errors.

Constellation projection and extension techniques may be improved in order to provide a more optimal extension mask for non-square constellations, such as shown in FIG. 9 and FIG. 10. Instead of extending the real and imaginary components in different processes, as described in FIG. 6 and FIG. 7, the projection is done using both real and imaginary components in a projection block (e.g., projection block 670 or projection block 790) simultaneously or together and combined. The projection block is modified to use a vector error signal as opposed to a scalar (i.e., real and imaginary) error signal in order to work in two dimensions simultaneously in extending the positions of the complex constellation values. The modification allows the extension mask to be defined in two dimensions, or as a vector, in order to increase the extended regions of each boundary point of the constellation. As a result, the extension follows the vector direction of the extendable constellation points. The extended region is a set of angular sectors with the vertex at the constellation point and an angle equal to the projection angle between two adjacent symbols and origin point for the constellation. For most non-square or constellations, the boundary lines for the angular sectors will be non-orthogonal.

Figure 11:
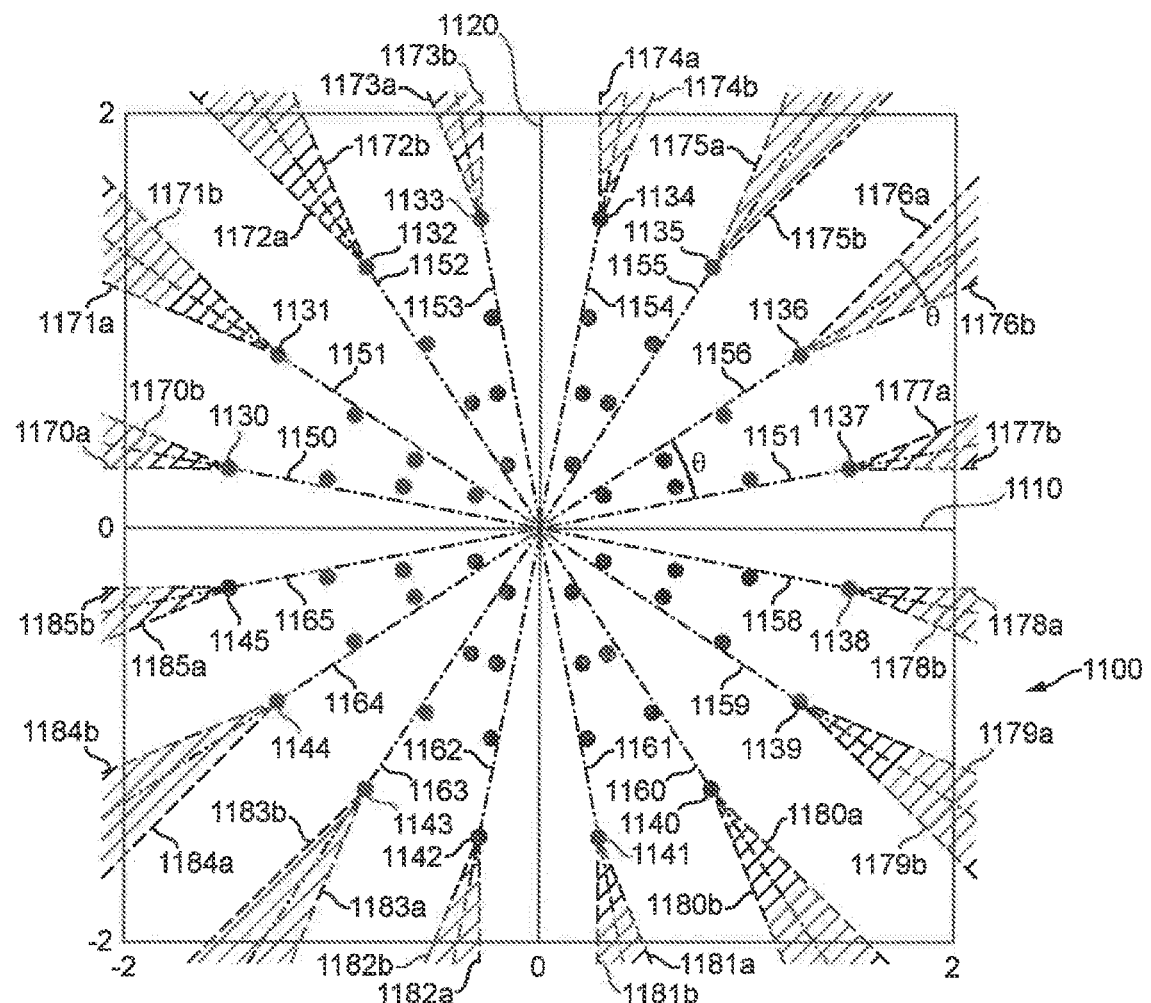
FIG. 11 shows a diagram for a 64-QAM non-square constellation applying improved PAPR techniques according to aspects of the present disclosure.

Turning to FIG. 11, a diagram 1100 illustrating the constellation extension techniques on a 64-QAM non-square constellation according to principles of the present disclosure is shown. Diagram 1100 illustrates the projection and projection extension mask using several projection scenarios and techniques based on using elements described above in FIG. 6 and FIG. 7. The constellation is projected with symbol points oriented along a real axis 1110 and an imaginary axis 1120.

Diagram 1100 includes outer constellation points 1130-1145. As in diagram 1000, the remaining inner points, shown here not labeled, are not affected by the constellation extension projection techniques. A set of first projection lines, labeled 1150-1165, are shown projecting from the origin (i.e., intersection of axis 1110 and axis 1120) to each outer constellation point 1130-1145 respectively. An angle θ represents the angular distance between any two outer constellation points of the constellation. The angle θ also represents an angular sector region in which an extension of any outer constellation may exist without producing an increase in symbol error probability for the symbol. The angular sector is shown as a region defined by dashed lines 1170a-1170b through 1185a-1185b. The extended region of the boundary constellation point is defined by the opening angle of the angular sector with the vertex at the original position for the point of the constellation.

The extension projection mask, as shown in diagram 1100, may be produced by processing the error signal from the multiplier (e.g., multiplier 650 or multiplier 770) along with the corrected signal from the adder (e.g., adder 660 or adder 780). By processing the error signal as a vector signal, an angular region may be produced for the extension region for the location of the outer constellation points in the constellation. The angular region is further determined in the projection block (e.g., projection block 670 or projection block 790) based on the constellation that is being used. It should be pointed out that the angular sector for the extension region is determined by the angular distance (e.g., angle θ in diagram 1100) between any two adjacent outer constellation points (e.g., points 1130-1145). The angular distance, and therefore, the angular sector for the extension region, may be different for different constellations.

It is important to note that the angular distance between the two adjacent outer constellation points, or angle θ, represents the maximum angular sector for the extension mask. An angular sector smaller than the maximum angular sector may also be used with reduced efficiency.

Figure 12:
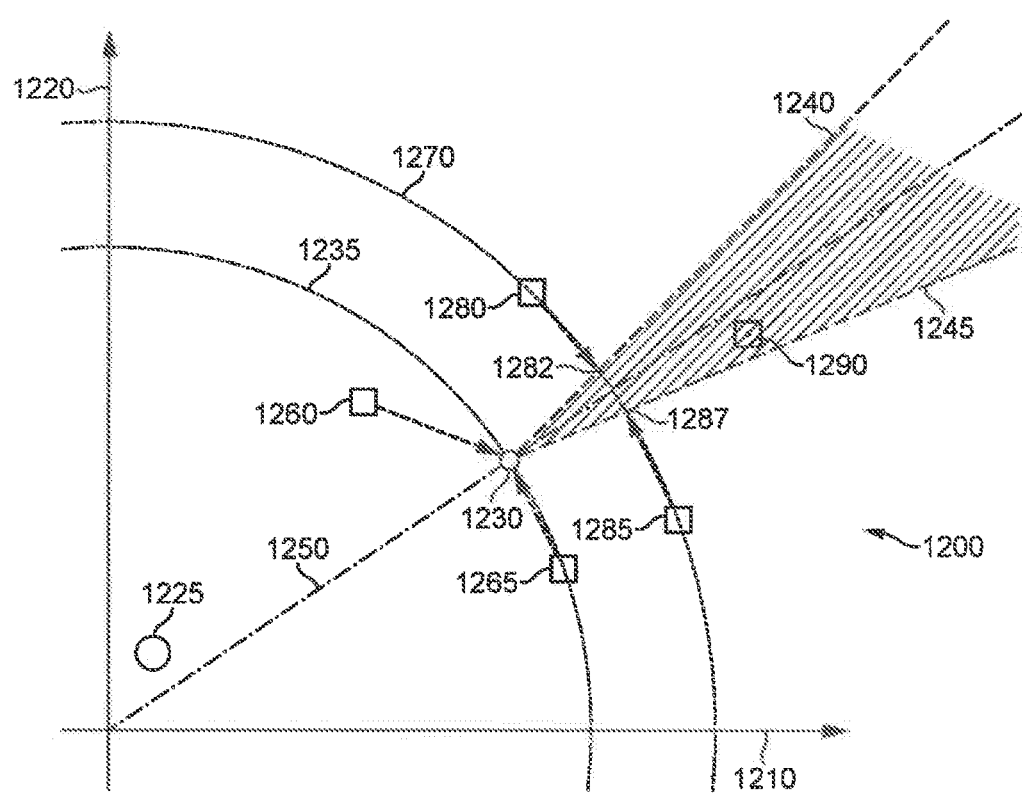
FIG. 12 shows a diagram illustrating the application of the extension mask to one point of the constellation with respect to different cases of the input signal of the projection block according to aspects of the present disclosure.

Turning to FIG. 12, a diagram 1200 illustrating the application of the extension mask to one point of the constellation with respect to different cases of the input signal of the projection block according to aspects of the present disclosure is shown. Diagram 1200 illustrates the projection and projection extension mask using several projection scenarios based on the projection techniques described above in FIG. 11 using elements such as those described above in FIG. 6 and FIG. 7. A single constellation point and accompanying region is shown oriented along an x-axis 1210 and a y-axis 1220 with an origin point 1225.

The initial symbol location in the constellation at the input of the pre-encoder is shown as point labeled 1230. The extension mask associated to the point 1230 is limited by the two lines 1240 and 1245. The open angle between 1240 and 1245 is an input parameter of the projection block. The maximum open angle is fixed for each type of constellation. However, an open equal to or less than the maximum open angle may be used. For example, the angular sector bound by lines 1240 and 1245 may be based on the angular distance between point 1230 and an adjacent symbol point, not shown. The angle bisector for the lines 1240 and 1245 is line 1250, shown as a dash-dot line, and passes through the center of the constellation, point 1225, and through point 1230.

The processing performed in a pre-encoder (e.g., pre-encoder 600 or pre-encoder 700) related to clipping, subtracting, and multiplying the signal may alter the position of the constellation symbol (e.g., point 1230). The projection block (e.g., projection block 670 or projection block 790) will re-position the symbol based on the techniques of the present disclosure. The following projection scenarios illustrated by points in diagram 1200 are further described here.

In a first scenario, the point labeled 1260 is considered. Point 1260 is inside the radial arc 1235 that is formed from the center 1225 and passing through 1230. As a result, point 1260 is projected to the original point 1230 because it cannot be projected in the extension mask.

In a second scenario, the point labeled 1265 is considered. Point 1265 is on the arc 1235. As a result, the point 1265 is also projected to the original point 1230 because it cannot be projected in the extension mask.

In a third scenario the points labeled 1280 and 1285 are considered. Points 1280 and 1285 are both outside the arc 1235 and will need to be projected in the extension mask. The point 1280 is outside the extension mask but it is projected onto an arc 1270 which has a center 1225 and passes through point 1280 as a well as a point 1282. Point 1282 is on the line 1240 representing the edge of the agular sector representing the extension mask for point 1230. As a result, point 1280 is projected to point 1282 in order to reposition the original point 1280 within the extension mask for point 1230. Similarly, the point 1285 is projected following arc 1270 and passing through 1285 as well as point 1287. Point 1287 is on the line 1245 representing the edge of the angular sector representing the extension mask for point 1230. As a result, point 1285 is projected to point 1287 in order to reposition the original point 1285 within the extension mask for point 1230.

In a fourth scenario, the point labeled 1290 is considered. Point 1290 is located inside the extension mask for point 1230 and defined by extension lines 1240 and 1245. As a result, the location for point 1290 is not changed or re-projected.

Figure 13:
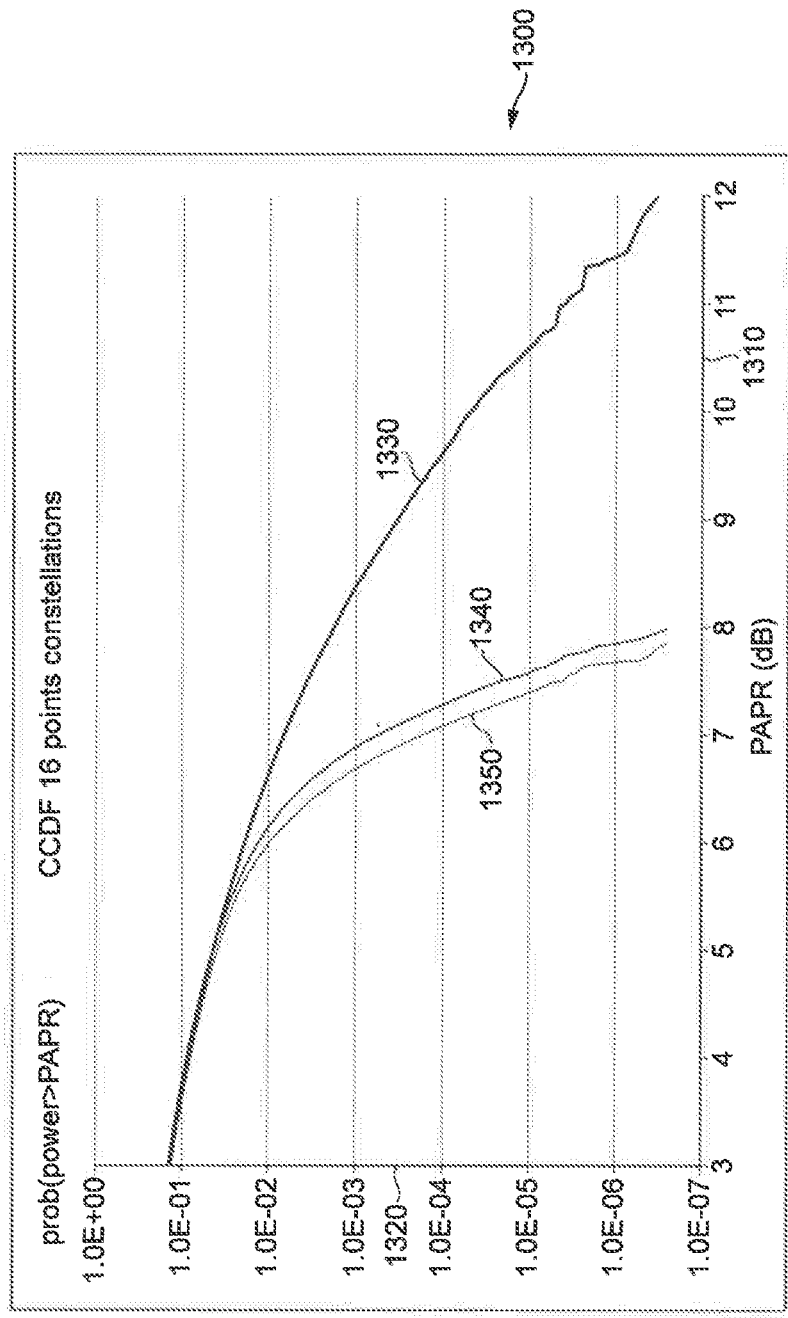
FIG. 13 shows a graph of performance of PAPR techniques for a 16-QAM non-square constellation according to aspects of the present disclosure.
Figure 14:
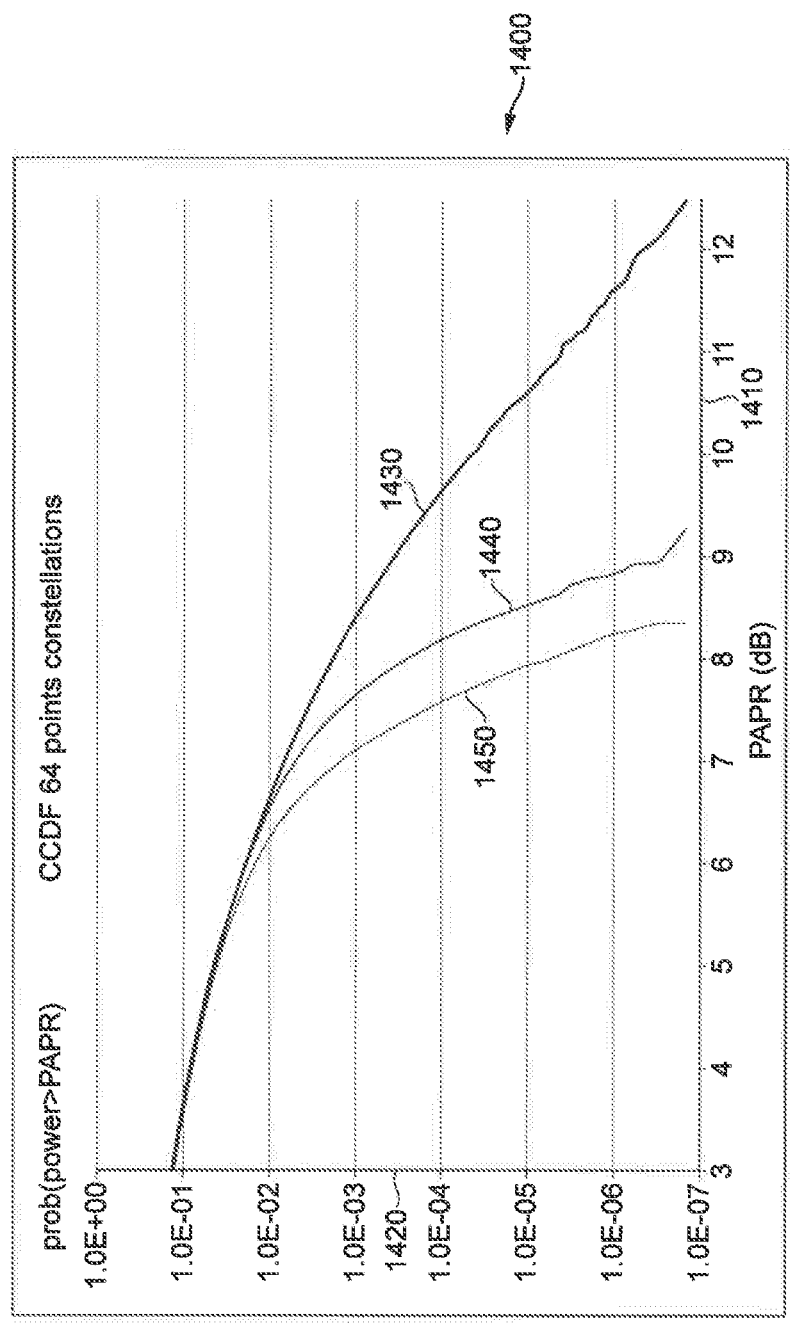
FIG. 14 shows a graph of performance of PAPR techniques for a 64-QAM non-square constellation according to aspects of the present disclosure
Figure 15:
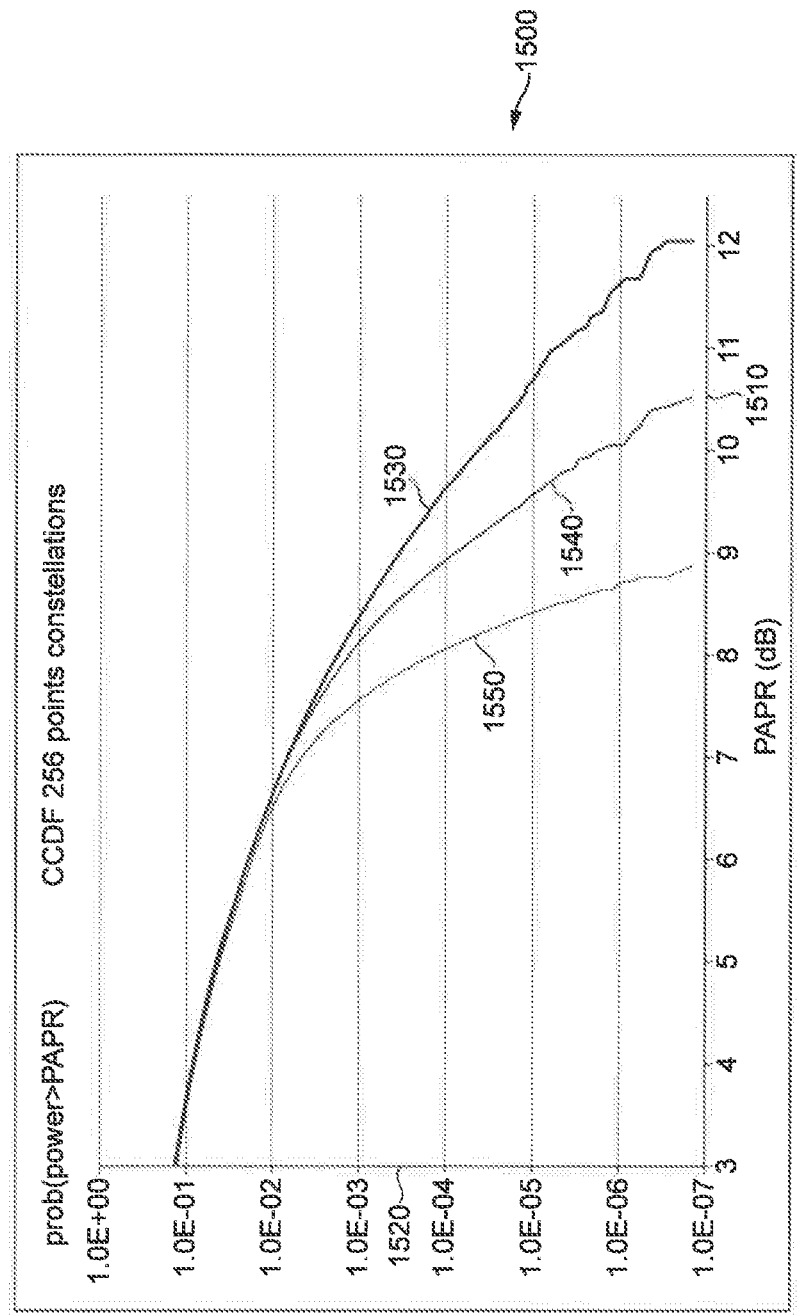
FIG. 15 shows a graph of performance of PAPR techniques for a 256-QAM non-square constellation according to aspects of the present disclosure.

Turning to FIGS. 13-15, a set of graphs 1300-1500 illustrating the simulated performance comparison for PAPR reduction techniques according to the principles of the present disclosure is shown. Each of the simulated performance results were generated using a signal operating in a DVB-T2 operating in 32K FFT mode in a 6 MHz wide channel. The operating condition represents a worst case condition. The signal does not contain either continuous or scattered pilot carriers.

The simulations are based on an implementation using a pre-encoder similar to pre-encoder 600 described in FIG. 6. Specifically, the value for $V_{clip}$ used in clipping block 620 is adjustable within the range [1.0; 3.5]. Further the value for K used in multiplier 650 is adjustable within the range [1; 63]. For each simulation shown in FIGS. 13-15, the values for $V_{clip}$ and K are optimized to get the best PAPR reduction.

Graph 1300 shows the PAPR in (dB) along the x-axis, labeled 1310, in relation to the Complementary Cumulative Distribution Function (CCDF) as the probability that (power>PAPR) along the y-axis, labeled 1320. The CCDF represents the distribution of probability of PAPR according to the PAPR for each sample or symbol of the signal. Graph 1300 shows results for a 16 point non-square constellation, such as shown in FIG. 9. Graph line 1330 represents the results with no PAPR reduction applied to the signal. Graph line 1340 represents the results using the DVB-T2 ACE techniques similar to those described in FIG. 8. Graph line 1350 represents the results using the improved techniques of the present disclosure, referred to as 2-D ACE techniques, similar to those described in FIG. 11.

Graph 1400 shows the PAPR in (dB) along the x-axis, labeled 1410, in relation to the CCDF as the probability (power>PAPR) along the y-axis, labeled 1420. Graph 1400 shows results for a 64 point non-square constellation, such as shown in FIG. 10. Graph line 1430 represents the results with no PAPR reduction applied to the signal. Graph line 1440 represents the results using the DVB-T2 ACE techniques. Graph line 1450 represents the results using the improved techniques of the present disclosure.

Graph 1500 shows the PAPR in (dB) along the x-axis, labeled 1510, in relation to the CCDF as the probability (power>PAPR) along the y-axis, labeled 1520. Graph 1500 shows results for a 256 point non-square constellation. Graph line 1530 represents the results with no PAPR reduction applied to the signal. Graph line 1540 represents the results using the DVB-T2 ACE techniques. Graph line 1550 represents the results using the improved techniques of the present disclosure.

The results for the graphs in FIGS. 13-15 are summarized in Table 1.

TABLE 1

| Constellation | Algorithm | Vclip | K | PAPR reduction (dB) | Improvement using 2-D ACE technique (dB) |
|---|---|---|---|---|---|
| 16 point non-square | DVB-T2 ACE | 2 | 25 | 4.1 | |
| | 2-D ACE | 1.9 | 19 | 4.3 | 0.2 |
| 64 point non-square | DVB-T2 ACE | 2.2 | 63 | 3.2 | |
| | 2-D ACE | 2 | 36 | 4.1 | 0.9 |
| 256 point non-square | DVB-T2 ACE | 2.4 | 63 | 1.5 | |
| | 2-D ACE | 2.2 | 61 | 3.1 | 1.6 |

Figure 16:
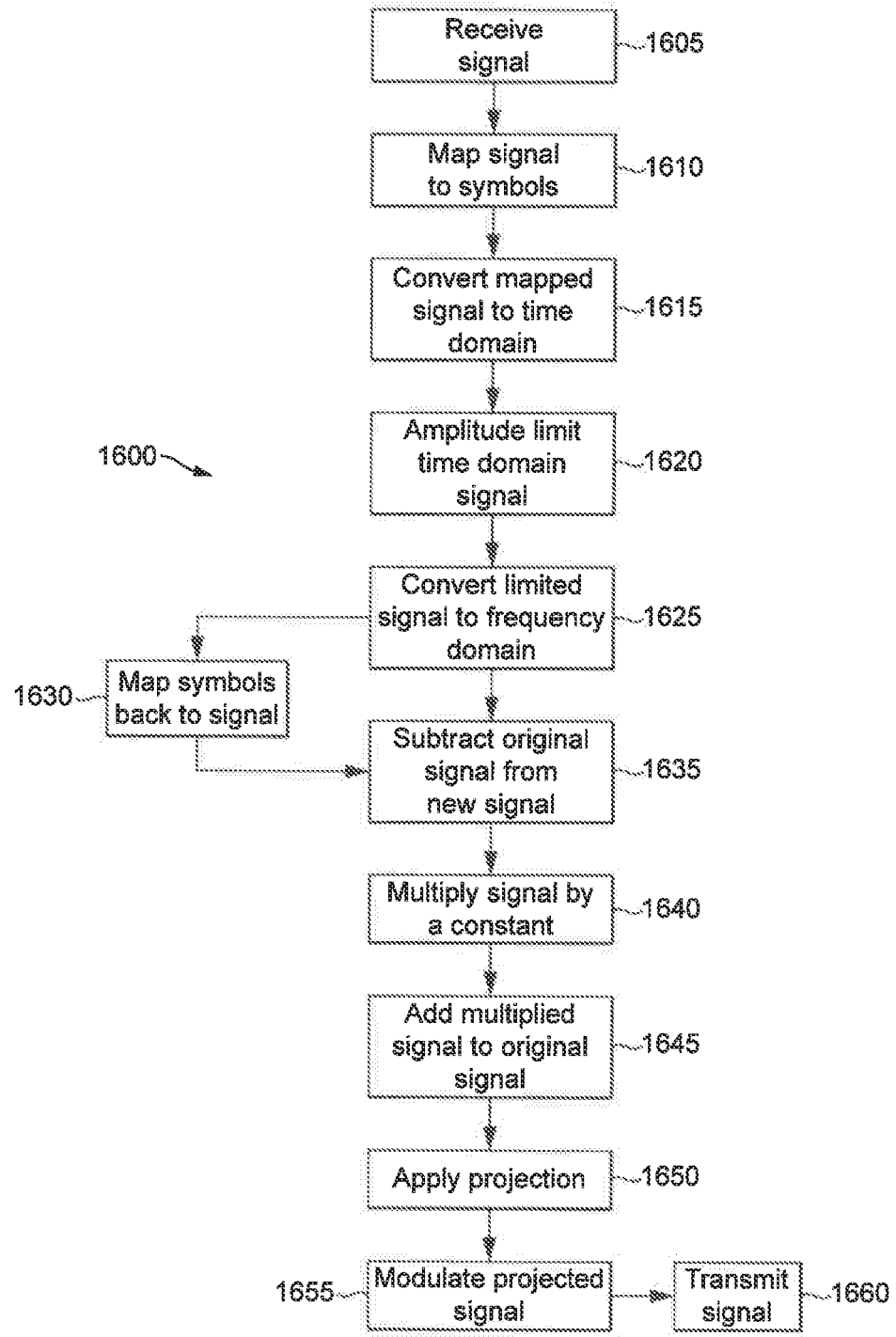
FIG. 16 shows a flow chart of an exemplary process for reducing the PAPR in a signal according to aspects of the present disclosure.

Turning now to FIG. 16, a flow chart of an exemplary process 1600 for reducing the PAPR in a signal according to aspects of the present disclosure is shown. Process 1600 describes a mechanism for reducing PAPR in a signal that includes or uses non-square constellation patterns for signal transmission. Process 1600 will primarily be described in terms of the pre-encoder 600 described in FIG. 6. Process 1600 may be equally applied to the operation of pre-encoder 700 described in FIG. 7. Process 1600 may also be used in transmitter 110 as part system 100 described in FIG. 1 or as part of data transmitter 300 described in FIG. 3. It is also important to note that some steps in process 1600 may be removed or reordered in order to accommodate specific embodiments associated with the principles of the present disclosure.

At step 1605 a signal is received. The signal may contain audio, video, signaling or control and other ancillary data (e.g., program guide data). The signal may be processed and may be a frequency domain representation of the signal content. Next, at step 1610, the signal is mapped to one or more symbols in a multiple transmission signaling arrangement. The mapping, at step 1610, may be performed in a STBC/SFBC encoder (e.g., STBC/SFBC encoder 710 described in FIG. 7.) The mapping, at step 1610, may involve generating a plurality of portions of the original signal using one or more known codeword sets including, but not limited to, a Golden code. The mapping, at step 1610, is particularly suited for use in MIMO transmission.

At step 1615, the mapped signal generated at step 1610 is converted to a time domain signal. In some embodiments, the time domain conversion, at step 1615, may return the signal received, at step 1605, to a signal originally provided by a content source (e.g., content source 111 described in FIG. 1). The conversion, at step 1615, may be performed using an IFFT block (e.g., IFFT block 610) or any similar transform processing block.

Next, at step 1620, the amplitude level of the time domain representation of the signal generated at step 1615 is limited, compressed, or clipped in order to reduce the signal amplitude level. The limiting, compressing, or clipping, at step 1620, may be performed in a clipping circuit (e.g., clipping block 620) or any similar circuit. In one embodiment, the signal generated at step 1615 is clipped based on an additional signal, Vclip. In other embodiments, the signal generated at step 1615 may be clipped, limited, or compressed using transfer function that includes a soft limiter function or, alternatively, a smooth compression function.

At step 1625, the amplitude limited signal is converted back to a frequency domain representation of the signal. The conversion, at step 1625, may be performed using an FFT block (e.g., FFT block 630) or any similar transform processing block. In some embodiments, the conversion, at step 1625 is an exact inverse of the conversion, at step 1615.

At step 1630, the frequency domain representation of the signal is mapped back from a set of symbols suitable for a plurality of signals in a multiple transmission signaling arrangement to a single signal. The mapping, at step 1630, may be performed in a STBC/SFBC decoder (e.g., STBC/SFBC decoder 750 described in FIG. 7.) The mapping, at step 1630, may involve demapping or decoding the plurality of portions of the original signal using one or more known codeword sets including, but not limited to, a Golden code. The mapping, at step 1630, is particularly suited for use in MIMO transmission.

At step 1635, the new signal generated, at step 1630, in the frequency domain is subtracted from the original signal received, at step 1605. The step of subtraction, at step 1635, may also include buffering the original signal in order to synchronize or time align the original signal with the new signal. Next, at step 1640, the resulting signal, from step 1635, is multiplied by a constant. Constant value may be a signal value K for all signals and symbols. In other embodiments, variable and different values for gain value may be applied as separate values Ki to each individual carrier, symbol, or portion of the signal. The values for Ki may be determined based on the transmitted values. Alternatively, the values for Ki may be obtained through a digital optimization algorithm. Ki values may be dependent on the number or carriers, the modulation, the definition of the extended constellation, the PAPR target, and/or the possible increase of power transmission. Different values for Ki may be generated based on the number of carriers in order to balance the distortions of power of the spectrum as a result of either unintentional clipping or intentional amplitude limiting, at step 1620.

At step 1645, the multiplied or amplified signal, from step 1640, is added to the original signal received, at step 1605. The step of addition, at step 1645, may also include buffering the original signal in order to synchronize or time align the original signal with the multiplied or amplified signal. Next, at step 1650, the resulting signal, from step 1645, is projected into a constellation projection extension mask. The constellation projection mask is based on the original constellation, using the received signal (e.g., the signal received at step 1605). The projection, at step 1650, may be carried out in a projection circuit or projection block (e.g., projection block 670 described in FIG. 6 or projection block 790 described in FIG. 7). A point or symbol that is projected, at step 1650, may be associated to an extension mask. In one embodiment, only the outer points of the constellation for the signal are associated with an extension mask. The extension mask represents a region in which a constellation point may be projected without obscuring its original symbol location, and its symbol value, within the constellation. In some instances, the extension mask may represent a line. In other instances, the extension mask may represent a region.

In a preferred embodiment, the projection, at step 1650, may be produced by processing the signal from the multiplication, at step 1640, along with the signal from the addition, at step 1645. By processing the signals as vector signals, an angular region may be produced for the extension region for the location of the outer constellation points in the constellation. The angular region may be further determined based on the constellation that is being used. It should be pointed out that a maximum angular sector for the extension region may be determined by the angular distance (e.g., angle θ in diagram 1100) between any two adjacent outer constellation points (e.g., points 1130-1145). The angular distance, and therefore, the maximum angular sector for the extension region, may be different for different constellations. Further, an angular sector that is less than the maximum angular sector may also be used.

At step 1655, the projected signal, representing a stream of reduced PAPR OFDM symbols, is modulated using an IFFT, to produce a time domain reduced PAPR OFDM signal. The modulation, at step 1655 may be performed in a modulator (e.g., modulator 114 described in FIG. 1 or OFDM modulators 340 and 350 described in FIG. 3). In some embodiments, the modulating, at step 1655, may further include mapping of the signal into a set of symbols for use in a multiple signal transmission environment employing MIMO techniques.

At step 1660, the time domain reduced PAPR OFDM signal is transmitted. The transmission, at step 1660, may be carried out by transmission circuits and may use one or more antennas for wireless transmission or broadcast (e.g., antenna 115 described in FIG. 1 or antennas 360 and 370 described in FIG. 3).

One or more of the steps of process 1600 may be rearranged, combined, or omitted. For example, in embodiments utilizing a SISO transmission configuration, including broadcast signal embodiments (e.g., ATSC 3.0 or DVB-T2), steps 1610 and 1630 may be omitted. Further, the generation of the projection constellation extension, at step 1650, may be produced through a series of process steps that differ from steps 1610 to 1645. As such, these different steps still encompass a process for pre-encoding the signal in order to permit the projection, at step 1650, of the processed signal onto a constellation projection extension as described herein.

In an embodiment using at least some of the steps of process 1600, a signal may be received that has been encoded using a specific FEC encoding structure that encodes the data in the signal at one or more different code rates. Several types of encoding structures are possible, including those described earlier in conjunction with DVB-T2 and ATSC 3.0 or others well known in the art. As a result, the constellation projection mask may depend on the code rate for the data as well as the constellation used for the transmission of the signal. Further, the angular distance (e.g., angle θ) for the outer constellation points in constellation may depend on both the constellation and the code rate. Table 2 shows an exemplary set of values for the angle θ given different constellations and code rates used as part of the ATSC 3.0 system:

TABLE 2

| Code Rate/Constellation | 2/15 | 3/15 | 4/15 | 5/15 | 6/15 | 7/15 | 8/15 | 9/15 | 10/15 | 11/15 | 12/15 | 13/15 |
|---|---|---|---|---|---|---|---|---|---|---|---|---|
| 16QAM | NA | 33.26° | 35.6° | 38.5° | 44.14° | 44.1° | 44.49° | 44.49° | 42.1° | NA | NA | NA |
| 64QAM | 22.96° | 39.36° | 41.26° | 19.01° | 21.17° | 22.49° | 22.28° | 22.49° | 22.4° | 19.75° | 18.42° | 16.81° |
| 256QAM | 36.67° | 40.26° | 19.11° | 22.47° | 8.38° | 11.23° | 11.23° | 10.93° | 11.22° | 10.63° | 8.8° | 8.34° |

According to specific embodiments of the disclosure, set of values for the angle θ is fully or partially defined by Table 2. According to specific embodiments of the disclosure, values for the angle θ are different. According to a variant of the disclosure, other codes rates or constellations are used and values for the angle θ are defined accordingly.

It is important to note the values given in Table 2 can be considered specific to the ATSC 3.0 system. However, other systems, using different constellations, different code rates, and possibly even different formats may use a different set of values for angle θ in order to achieve similar results based on the principles of the present disclosure.

A system may employ signals that use a non-square constellation for some signal formats while using other constellation types for other signal formats. In one embodiment using at least of the steps of process 1600, a signal may use a non-square constellation, referred to as a two dimensional (2D) constellation for some signal formats while using a square constellation, referred to as a one dimensional (1D) constellation for other signal formats. Table 3 shows a specific implementation for type of constellation (1D or 2D) for different constellation sizes as well as difference code rates used as part of the ATSC 3.0 system:

TABLE 3

| Code Rate/Constellation | 2/15 | 3/15 | 4/15 | 5/15 | 6/15 | 7/15 | 8/15 | 9/15 | 10/15 | 11/15 | 12/15 | 13/15 |
|---|---|---|---|---|---|---|---|---|---|---|---|---|
| QPSK | 1D | 1D | 1D | 1D | 1D | 1D | 1D | 1D | 1D | 1D | 1D | 1D |
| 16QAM | 1D | 2D | 2D | 2D | 2D | 2D | 2D | 2D | 2D | 1D | 1D | 1D |
| 64QAM | 2D | 2D | 2D | 2D | 2D | 2D | 2D | 2D | 2D | 2D | 2D | 2D |
| 256QAM | 2D | 2D | 2D | 2D | 2D | 2D | 2D | 2D | 2D | 2D | 2D | 2D |
| 1024QAM | 1D | 1D | 1D | 1D | 1D | 1D | 1D | 1D | 1D | 1D | 1D | 1D |
| 4096QAM | 1D | 1D | 1D | 1D | 1D | 1D | 1D | 1D | 1D | 1D | 1D | 1D |

According to specific embodiments of the disclosure, types of constellations are fully or partially defined by Table 3. According to specific embodiments of the disclosure, types of constellations are different (e.g. a non square constellation may be used for 1024 QAM or 4096 QAM). According to a variant of the disclosure, other codes rates or constellations are used.

Signals using 2D constellations may employ a PAPR process, such as described by process 1600. Signals using 1D constellation may employ a PAPR process similar to that shown and described in FIG. 8 and FIG. 9. Collectively, the processing of 1D and 2D constellations to reduce PAPR may be referred to as active constellation extension (ACE) techniques. Further, ACE techniques, such as the PAPR process described in FIG. 16, or other PAPR processes for 1D constellation, when used in conjunction with OFDM, are typically applied only to the portion of the signal that includes data and typically not be applied to pilot carriers or reserved tones included as part of the signal. In systems, such as the ATSC 3.0 system, ACE techniques are applied only to the portion of the signal that includes data and is not applied to pilot carriers or reserved tones included as part of the signal. Another PAPR process, called Tone Reservation (TR) introduces reserved tones into the OFDM symbols to reduce PAPR. In ATSC 3.0, if both ACE and TR are used, the ACE is applied to the signal first.

Further, the PAPR techniques may not be used in conjunction with the use of level division multiplexing (LDM) or when either MIMO or MISO operational modes are used in a system. In system, such as the ATSC 3.0 system, PAPR techniques, and specifically ACE, is not used in conjunction with the use of level division multiplexing (LDM) or when either MIMO or MISO operational modes. Finally, the use, or lack thereof, the active constellation techniques may be indicated in the signal as part of a header or other informational layer such as, but not limited to, the L1 signaling in DVB-T2 or ATSC 3.0.

Figure 17:
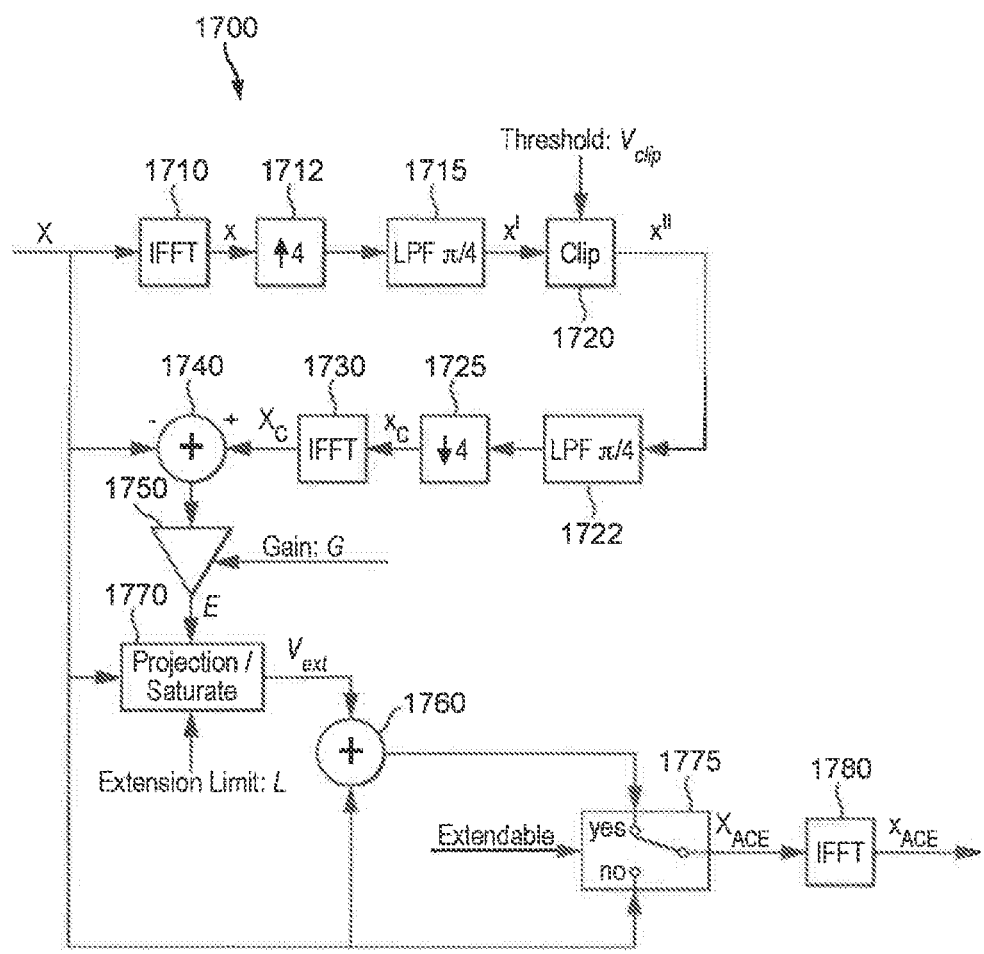
FIG. 17 illustrates a block diagram of a further exemplary pre-encoder used in a data transmitter according to aspects of the present disclosure.

Turning now to FIG. 17, a block diagram of a further exemplary pre-encoder 1700 according to aspects of the present disclosure is shown. Pre-encoder 1700 operates in a manner similar to pre-encoder 600 described in FIG. 6. Pre-encoder also operates in a manner similar to pre-encoder 320 in FIG. 3. Pre-encoder 1700 may further be used as part of a broadcast transmitter, such as transmitter 110 described in FIG. 1. Except as described below, elements 1710, 1720, 1730, 1740, 1750, 1760, and 1770 are similar in function to elements 610, 620, 630, 640, 650, 660, and 670 described in FIG. 6 and will not be further described here.

In pre-encoder 1700, a signal, labeled $x'=[x'_0, x'_1, \ldots, x'_{N_{FFT}-1}]$ is obtained from an input signal x through interpolation by a factor of 4 in interpolator 1712 followed by low-pass filter 1715. The combination of IFFT 1710, oversampling through interpolator 1712, and low-pass filtering in low-pass filter 1715 is implemented using zero padding and a four times oversized IFFT operator as part of IFFT 1710.

A signal labelled $x''=[x''_0, x''_1, \ldots, x''_{N_{FFT}-1}]$ is obtained by applying a clipping operator in clipping block 1720 to the signal labeled x'. The clipping operator in clipping block 1720 is defined as follows:

$$x''_k = \begin{cases} x'_k, & \text{if } |x'_k| \leq V_{clip} \\ V_{clip} \cdot \dfrac{x'_k}{|x'_k|}, & \text{if } |x'_k| > V_{clip} \end{cases} \quad \text{(equation 2)}$$

The clipping threshold $V_{clip}$ is a parameter of the active constellation extension algorithm and techniques. For example, the clipping threshold $V_{clip}$ may be selectable in the range between +0 dB and +12.7 dB in 0.1 dB steps above the standard deviation of the original time-domain signal.

A signal labeled $x_c=[x_{c0}, x_{c1}, \ldots, x_{cN_{FFT}-1}]$ is obtained from the signal labelled x" through lowpass filtering in low-pass filter 1722 and decimation by a factor of 4 in decimator 1725. A signal labeled $X_c$ is obtained from $x_c$ using an FFT operation in FFT block 1730. The combination of low-pass filtering in low-pass filter 1722, downsampling in decimator 1725, and FFT operations in FFT block 1730 is implemented using a four times oversized FFT operator.

The Error vector, labeled E, is obtained by combining, through a subtraction and gain multiplication operation, the signals labeled $X_c$ and X in subtractor 1740 and gain block 1750 as follows:

$$E = G \cdot (X_c - X) \quad \text{(equation 3)}$$

The extension gain G is a parameter of the active constellation extension algorithm and techniques. For example, the value for the extension gain G may be selectable in the range between 0 and 31 in steps of 1.

The Extension vector, labeled $V_{ext}$, is obtained or generated as an output from projection block 1770 as follows:

$$\arg(V_{ext,k}) = \begin{cases} \dfrac{\theta}{2}, & \text{if } \dfrac{\theta}{2} < \varphi_{e,k} < 90°; \\ -\dfrac{\theta}{2}, & \text{if } -90° < \varphi_{e,k} < -\dfrac{\theta}{2}; \\ \varphi_{e,k}, & \text{else} \end{cases} \quad \text{(equation 4)}$$

$$|V_{ext,k}| = \begin{cases} |E_k|, & \text{if } (|E_k| \leq L - |X_k|) \text{ AND} \\ & \left(\dfrac{\theta}{2} < \varphi_{e,k} < 90°\right) \\ L - |X_k|, & \text{if } (|E_k| > L - |X_k|) \text{ AND} \\ & \left(-90° < \varphi_{e,k} < -\dfrac{\theta}{2}\right) \\ 0, & \text{else} \end{cases} \quad \text{(equation 5)}$$

The element $\varphi_e$ denotes the angle between the argument of reference symbol X and the Error vector E. A limiting element, labeled maximal extension value L may be applied and is a parameter of the active constellation extension algorithm and techniques. For example, the maximal extension value L may be selectable in the range between 1.8 and 2.4 in 0.1 steps.

The angle θ is also an input parameter to the active constellation extension algorithm and techniques in pre-encoder 1700 and is dependent on the constellation dimension (e.g., for each 2D constellation described earlier) as well as the forward error correction code rate. An exemplary set of values for angle θ for a set of constellations and code rates are described earlier in Table 2.

A signal labeled $X_{ACE}$ is generated or constructed by adding the Extension vector, labeled $V_{ext}$, to the signal, labeled X, in adder 1760 and as a selection in extension switch 1775, as follows:

$$X_{ACE,k} = \begin{cases} X_k + V_{ext,k}, & \text{if } X_k \text{ is extendable;} \\ X_k, & \text{else} \end{cases} \quad \text{(equation 6)}$$

A component of the signal, labeled $X_k$, is defined as extendable if it is an active cell (i.e. an OFDM cell carrying a constellation point), and if it carries a boundary point of the modulation constellation used for that cell. A component $X_k$ may also defined as extendable if it is a dummy cell, a bias balancing cell, or an unmodulated cell in the Frame Closing Symbol, as defined and used in modulation systems, such as DVB-T2 and ATSC 3.0. For example, a component belonging to a 256-QAM 9/15 modulated cell in an ATSC 3.0 format signal is a boundary point of the constellation if its modulus is greater than or equal to 1.65.

A signal labeled $X_{ACE}$ is obtained or generated from $X_{ACE}$ through an IFFT operation in IFFT block 1780 and represents the output signal for pre-encoder 1700.

Figure 18A:
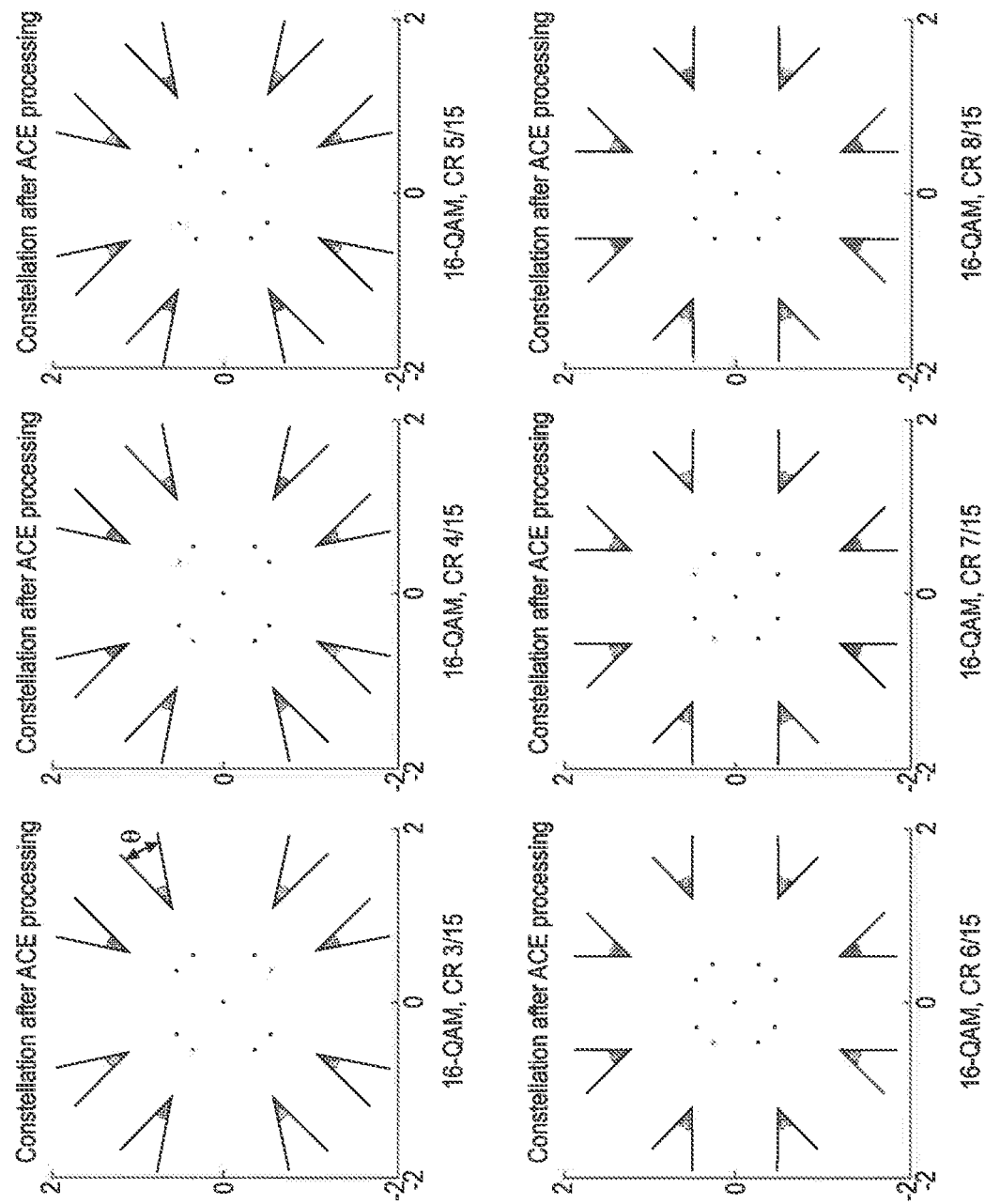
FIGS. 18A and 18B show a series of diagrams for a 16-QAM non-square constellation having different error correction code rates applying PAPR techniques according to aspects of the present disclosure.
Figure 18B:
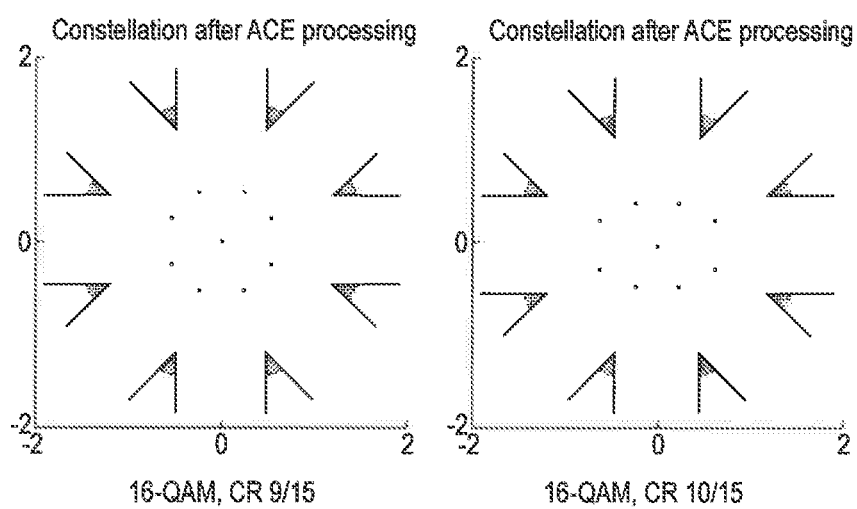

FIGS. 18A and 18B show a series of diagrams for a 16-QAM non-square constellation having different error correction code rates applying PAPR techniques according to aspects of the present disclosure. In particular, FIGS. 18A and 18B show the different angles θ that may be used in a pre-encoder (e.g., pre-encoder 1700 described in FIG. 17) for signals using different FEC code rates. The code rates and angles θ that are shown in FIGS. 18A and 18B are similar to the code rates and angles included for a 16-QAM 2D constellation described earlier in Table 2.

Figure 19A:
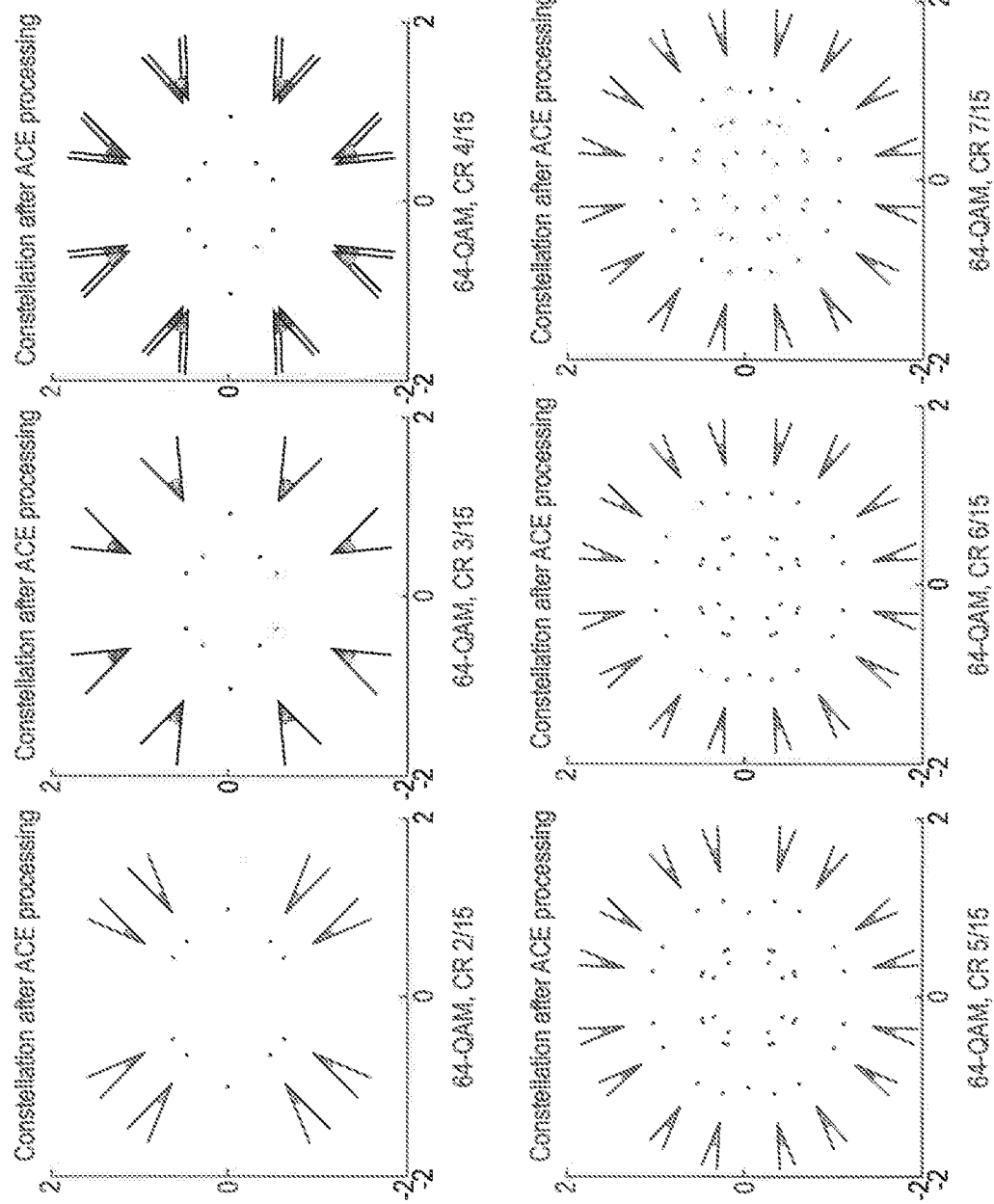
FIGS. 19A and 19B show a series of diagrams for a 64-QAM non-square constellation having different error correction code rates applying PAPR techniques according to aspects of the present disclosure.
Figure 19B:
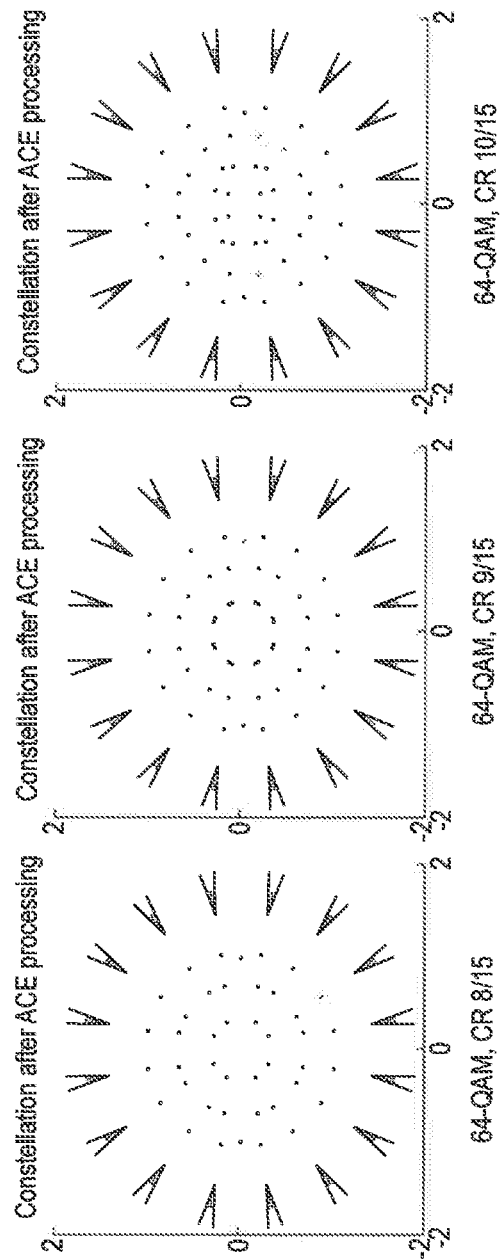
Figure 19B:
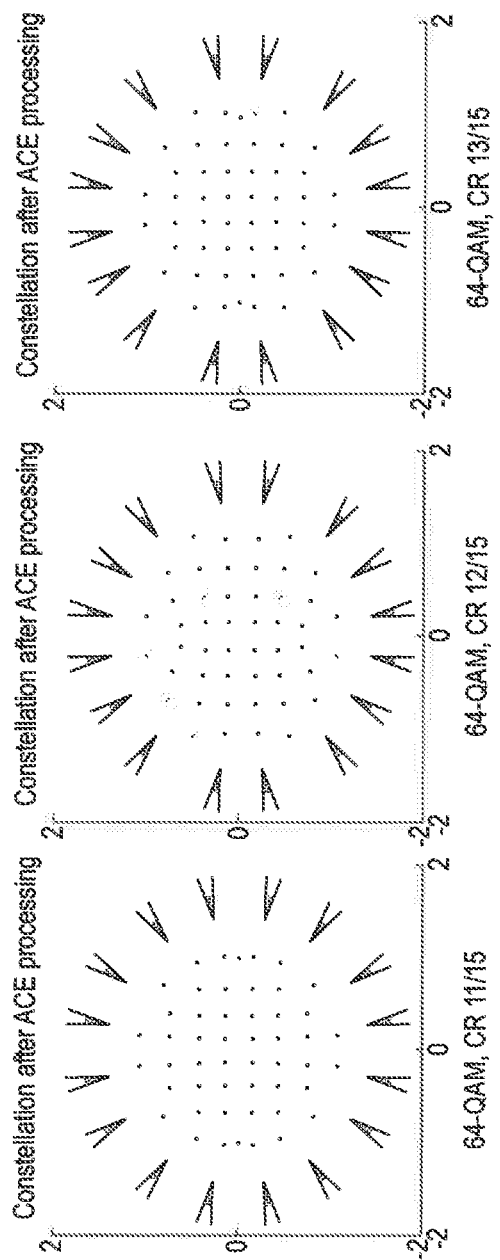

FIGS. 19A and 19B show a series of diagrams for a 64-QAM non-square constellation having different error correction code rates applying PAPR techniques according to aspects of the present disclosure. In particular, FIGS. 19A and 19B show the different angles θ that may used in a pre-encoder (e.g., pre-encoder 1700 described in FIG. 17) for signals using different FEC code rates. The code rates and angles θ that are shown in FIGS. 19A and 19B are similar to the code rates and angles included for a 64-QAM 2D constellation described earlier in Table 2.

Figure 20:
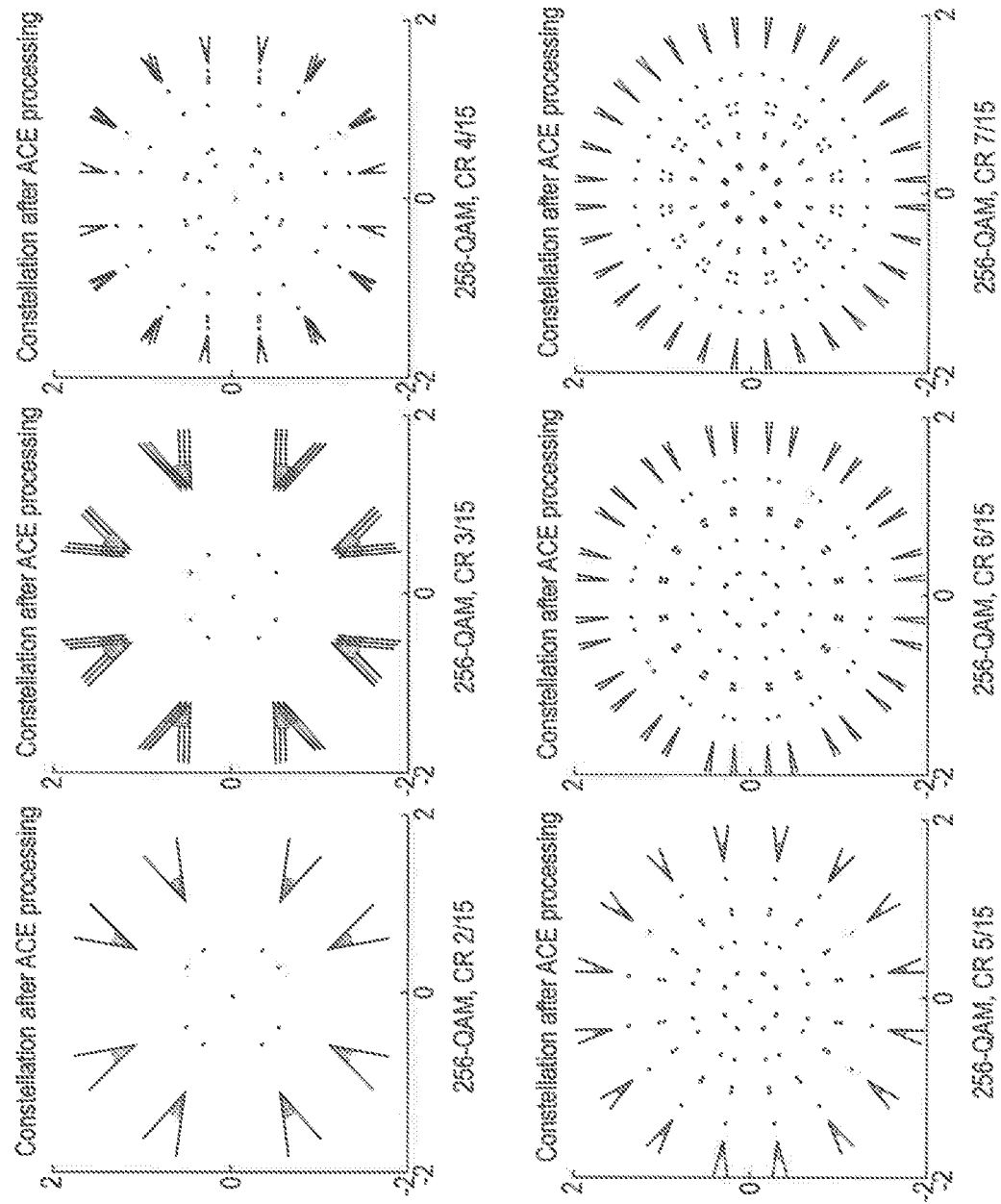
FIG. 20 shows a series of diagrams for a 256-QAM non-square constellation having different error correction code rates applying PAPR techniques according to aspects of the present disclosure.

FIG. 20 shows a series of diagrams for a 256-QAM non-square constellation having different error correction code rates applying PAPR techniques according to aspects of the present disclosure. In particular, FIG. 20 shows the different angles θ that may be used in a pre-encoder (e.g., pre-encoder 1700 described in FIG. 17) for signals using different FEC code rates. The code rates and angles θ that are shown in FIG. 20 are similar to the code rates and angles included for a 256-QAM 2D constellation described earlier in Table 2.

A signal may be transmitted using the principles of the present disclosure. The signal may consist of a time domain representation of symbols in a constellation. The signal may include symbols mapped to a plurality of constellations. One or more of the constellations may be non-square constellations including, but not limited, to a 16 QAM non-square constellation, and 64 QAM non-square constellation, and a 256 QAM non-square constellation. One or more of the symbol locations may be adjusted based on a projection, such as the constellation projection extensions described above. In one embodiment, one or more symbols are projected into a constellation projection extension region that is represented by an outward angular sector based on the original or correct symbol location(s). The outward angular sector is formed using the projection angle formed between the original or correct symbol location(s) and adjacent symbol locations. The projection angle forms a first boundary and a second boundary for the outward angular region, the value for the projection angle being based on the constellation pattern for the signal as well as a code rate for the stream of data. In one embodiment, the transmitted signal is an OFDM signal. In another embodiment, the transmitted signal complies with a transmission, such as DVB-T2 or ATSC3.0.

The signal transmitted using the principles of the present disclosure has a reduced PAPR. The reduced PAPR signal may offer several advantages including improving the efficiency of the HPA and minimizing distortion that create undesired noise within the signal as well as in frequency ranges adjacent to the frequency range for the transmitted signal.

It is important to note that the techniques of the present disclosure also applies to non uniform, non square constellations similar to those shown FIGS. 18A, 18B, 19A, 19B and 20. Non uniform constellations may provide better performance with simulations showing an improvement 1.5 dB compared to the use of uniform constellations. According to a variant, the techniques may also be applied to other uniform, non square constellations such as Amplitude Phase Shift Keying (APSK) constellations.

The transmitted signal using the mechanisms of the present disclosure may be received and decoded using a receiver device adapted to receive the transmitted signal. For example, the transmitted signal may be received by a broadcast receiver (e.g., receiver 120 described in FIG. 1). In one embodiment, the receiver, in addition to functions similar to those previously described, may include decoding circuitry and processing to provide an estimation of transmitted signal on extended constellation associated to extended region to provide an extended decoded signal. The extended region may be an outward angular sector with a vertex being the original symbol location for the basic constellation used as part of the demodulation, the outward angular region defined by a value for an angle that forms a first boundary and a second boundary for the outward angular region, the value for the angle based on the constellation and a code rate for the stream of data.

The decoding and processing may also include the assigning of one or more symbols from the estimation using the extended region to a symbol value based on symbol locations in the basic or non-extended constellation. The decoding and processing may be performed in a demapper used for processing all of the symbols in the received signal. The decoding circuitry, including the demapper, and processing associated with the principles of the present disclosure may further be included in a demodulator (e.g., demodulator 124 described in FIG. 1), or in a channel decoder (e.g., channel decoder 123 described in FIG. 1), or in both.

In one embodiment, a receiver (e.g., receiver 120 described in FIG. 1) is adapted to receive signals transmitted using a transmission standard compliant with ATSC 3.0. The signal includes at least of portion that has been modulated using a 2D constellation and has been encoded using a forward error correction code rate such as is described earlier in Table 2. The receiver decodes the received signal to provide an estimation of at least one symbol in the transmitted signal on an extended constellation to provide an extended decoded signal, the extended constellation including at least on extended region formed as an outward angular sector from an original location for a symbol in the constellation, the outward angular region defined by a value for an angle forming a first boundary and a second boundary for the outward angular region, the value for the angle based on the constellation and the code rate for the stream of data. The value for the angle may be the value given in Table 2. Exemplary receivers capable of receiving ATSC 3.0 signal may be included as part of televisions, set-top boxes, computers, gateways, mobile phones, mobile terminals, automobile radio receivers, tablets, and the like.

The transmitted signal may also be received by a receiver employing MIMO signal reception techniques (e.g, data receiver 400 described in FIG. 4). The MIMO signal corresponds to a transmitted signal that has been obtained by time or frequency mapping the input data on an extended constellation and on multiple carriers to generate a frequency domain symbol per transmit antenna to generate multi-carrier signals and transmission on a signal. The complex time or frequency de-mapping associated with the MIMO signal may be carried out after projection decoding of the signal on the extended region constellation associated to points of a corresponding basic constellation. The projection includes providing an estimate of the transmitted signal on the extended constellation associated to an extended region having an outward angular sector with a vertex being the original symbol location. The projection may also include initially assigning symbols in extended decoded signal to symbols of a basic or non-extended constellation, the outward angular region defined by a value for an angle that forms a first boundary and a second boundary for the outward angular region, the value for the angle based on the constellation and a code rate for the stream of data. The projection decoding and processing may be performed in a separate demapper used for processing the projected symbols in the received signal. The projection decoding circuitry, including the demapper, and processing associated with the principles of the present disclosure may further be included in a demodulator (e.g., OFDM demodulator 430 and 440 described in FIG. 4), or in a time or frequency demapper (e.g., time/frequency demapper 450 described in FIG. 4), or in both.

It is important to note that a receiver (e.g., receiver 120 described in FIG. 1 or data receiver 400 described in FIG. 4), and more particularly the demapping and projection decoding circuitry and functions, must be capable of processing signals contained in the extended constellation. In order to improve the performance of the receiver, an additional limiter circuit may be added to the receiver before any processing performed by the demapper and/or projection decoding. The limiter circuit may limit or clip the amplitude of the signal. In one embodiment, a scalar limiter may be added to limit or clip the amplitude in the x-axis and y-axis, often referred to as the in-phase (I) and quadrature (Q) axes. However, in a preferred embodiment using non-square constellations as part of the signal transmission, a complex modulus clipping circuit may be used in order to clip the signal as a vector.

The embodiments above describe various mechanisms and embodiments for processing a stream of input data into a signal containing a constellation of OFDM symbols used for signal transmission in order to reduce the PAPR for the signal. The mechanisms may include processing or pre-encoding the data, represented as symbols in a constellation, to apply a constellation extension projection in a constellation to at least one symbol, and modulating the pre-encoded signal to produce a transmitted signal, wherein the processing or pre-encoding applies a constellation extension projection to the at least one symbol in an outward angular sector using a vector based error signal. The boundaries produced for the outward angular sector may be inherently non-orthogonal and are based on an angular distance between adjacent symbols or points in a constellation pattern. The outward angular region is defined by a value for an angle between a first boundary and a second boundary for the outward angular region, the value for the angle based on the constellation and a signal stream encoding code rate, for instance after FEC is applied, for the data. The angular sector used in the constellation extension projection is more optimal particularly when used in conjunction with non-square constellation patterns.

The present embodiments also apply to a data signal obtained by a method as mentioned earlier. The present embodiments also apply to any decoder or decoding method adapted to decode this data signal. In particular, an embodiment applies to a data signal obtained from a method for processing a stream of data as part of transmitting the signal, the method that includes pre-encoding the stream of data in order to reduce peak to average power ratio of the transmitted signal by applying a symbol constellation extension projection to at least one symbol in a constellation used as part of a transmitted signal, the symbol constellation extension projection having an outward angular region from an original position for the at least one symbol in the constellation, the outward angular region defined by a value for an angle between a first boundary and a second boundary for the outward angular region, the value for the angle based on the constellation and a code rate for the stream of data. According to specific embodiments of the disclosure, the method for processing a stream includes a terrestrial broadcasting of the data signal. According to specific embodiments of the disclosure, the data signal includes video and/or audio data. According to specific embodiments of the disclosure, the received or transmitted signal includes or is a terrestrial broadcast signal.

The present embodiments describe a method for processing a stream of data converted into a plurality of symbols in a constellation as part of transmitting a signal that includes applying a symbol constellation extension projection to at least one symbol in the constellation, the symbol constellation extension projection having an outward angular region from an original position for the at least one symbol in the constellation, the outward angular region defined by a value for an angle between a first boundary and a second boundary for the outward angular region, the value for the angle determined by a selection of the constellation used as part of the transmitted signal and a code rate used for encoding the stream of data.

In some embodiments, the method may include the outward angular region being formed between two boundary lines, the two boundary lines being non-orthogonal to each other.

In some embodiments, the method may include the angle between the two boundary being equal to or less than the angle formed between a projection line from an origin point in the constellation and the at least one symbol and a projection line from the origin point in the constellation and a symbol adjacent to the at least one symbol.

In some embodiments, the constellation may be at least one of a 16 QAM non-square constellation, a 64-QAM non-square constellation, and a 256-QAM non-square constellation.

In some embodiments, the constellation may be a non-uniform constellation.

In some embodiments, the value for the angle may be based on the constellation and the code rate values as given in Table 2 described above.

In some embodiments, the signal may comply with the Advanced Television Standards Committee (ATSC) version 3.0 standard.

In some embodiments, the method may further include performing a transform on the signal, including the at least one symbol having the symbol constellation extension projection, to produce a transform signal, and modulating the pre-encoded transform signal to produce a transmitted signal.

In some embodiments, the applying may further include performing a transform on the stream of data to convert the stream of data to a transform domain signal, limiting the amplitude of the transform domain signal to produce a clipped transform signal, performing an inverse transform on the clipped transform signal to produce an inverse transform signal, subtracting the stream of data from the inverse transform signal to produce a remainder signal, adjusting the signal level of the remainder signal by a pre-determined gain factor to produce an adjusted remainder signal, and adding the stream of data to the adjusted remainder signal to produce an error signal.

In some embodiments, the performing a transform or performing an inverse transform may use a Fourier transform.

In some embodiments, the method may be used as part of an orthogonal frequency division multiplexing transmission.

In some embodiments, the method may be used as part of a two dimensional active constellation extension for the signal.

In some embodiments, an indication of the use of the two dimensional active constellation extension for the signal may be included in the transmitted signal.

In some embodiments, the indication of use of the two dimensional active constellation extension for the signal may be included in L1 signaling portion of the transmitted signal.

In some embodiments, the processing of the stream of data is performed in order to reduce peak to average power ratio of the transmitted signal.

The present embodiments also include an apparatus or portion thereof that can be configured to perform any of the elements or steps of a process as described in one ore more of the preceding paragraphs describing a process or method for processing a stream of data converted into a plurality of symbols in a constellation as part of transmitting a signal.

The present embodiments also describe an apparatus for processing a stream of data converted into a plurality of symbols in a constellation as part of transmitting a signal that includes a projection module, the projection module applying a symbol constellation extension projection to at least one symbol in the constellation, the symbol constellation extension projection having an outward angular region from an original position for the at least one symbol in the constellation, the outward angular region defined by a value for an angle between a first boundary and a second boundary for the outward angular region, the value for the angle determined by a selection of the constellation used as part of the transmitted signal and a code rate for used for encoding the stream of data.

The present embodiments also include a method for processing a received signal transmitted as a constellation of symbols representing a data stream that has been encoded using a code rate that includes demodulating the received signal to provide an estimation of at least one symbol in the transmitted signal on an extended constellation, the extended constellation including at least one extended region formed as an outward angular sector from an original location for a symbol in the constellation, the outward angular region defined by a value for an angle between a first boundary and a second boundary for the outward angular region, the value for the angle determined by a selection of the constellation used as part of the transmitted signal and the code rate for the data stream in the signal.

The present embodiments also describe an apparatus or portion thereof for processing a received signal implementing the process described in the preceding paragraph.

The present embodiments also describe an apparatus for processing a received signal transmitted as a constellation of symbols representing a data stream that has been encoded using a code rate that includes a demodulator that demodulates the received signal to provide an estimation of at least one symbol in the transmitted signal on an extended constellation, the extended constellation including at least one extended region formed as an outward angular sector from an original location for a symbol in the constellation, the outward angular region defined by a value for an angle between a first boundary and a second boundary for the outward angular region, the value for the angle determined by a selection of the constellation used as part of the transmitted signal and the code rate for the data stream in the signal.

The present embodiments also describe a non-transitory device readable medium containing instructions for processing a stream of data converted into a plurality of symbols in a constellation as part of transmitting a signal including applying a symbol constellation extension projection to at least one symbol in the constellation, the symbol constellation extension projection having an outward angular region from an original position for the at least one symbol in the constellation, the outward angular region defined by a value for an angle between a first boundary and a second boundary for the outward angular region, the value for the angle determined by a selection of the constellation used as part of the transmitted signal and a code rate used for encoding the stream of data.

The present embodiments also describe a non-transitory device readable medium containing instructions for processing a received signal transmitted as a constellation of symbols representing a data stream that has been encoded using a code rate including demodulating the received signal to provide an estimation of at least one symbol in the transmitted signal on an extended constellation, the extended constellation including at least on extended region formed as an outward angular sector from an original location for a symbol in the constellation, the outward angular region defined by a value for an angle between a first boundary and a second boundary for the outward angular region, the value for the angle determined by a selection of the constellation used as part of the transmitted signal and the code rate for the data stream in the signal.

The present embodiments also describe an electromagnetic signal including a processed stream of data converted into a plurality of symbols in a constellation, the electromagnetic signal processed by applying a symbol constellation extension projection to at least one symbol in the constellation, the symbol constellation extension projection having an outward angular region from an original position for the at least one symbol in the constellation, the outward angular region defined by a value for an angle between a first boundary and a second boundary for the outward angular region, the value for the angle determined by a selection of the constellation used as part of the transmitted signal and a code rate used for encoding the stream of data.

Although embodiments which incorporate the teachings of the present disclosure have been shown and described in detail herein, those skilled in the art can readily devise many other varied embodiments that still incorporate these teachings. Having described preferred embodiments of an apparatus and method for reducing peak to average power ratio in a signal (which are intended to be illustrative and not limiting), it is noted that modifications and variations can be made by persons skilled in the art in light of the above teachings. It is therefore to be understood that changes may be made in the particular embodiments of the disclosure disclosed which are within the scope of the disclosure as outlined by the appended claims.

The invention claimed is:

1. A method for processing a stream of data represented by a plurality of symbols associated with a constellation, the method comprising:
applying a symbol constellation extension projection to at least one of the plurality of symbols, the symbol constellation extension projection having an outward angular region, the outward angular region defined by a value of an angle, the value of the angle equal to or less than an angular distance between two symbols in the constellation, wherein the value of the angle is based on the constellation and a code rate used for encoding and transmitting the stream of data according to the following table:

| Code Rate/Constellation | 2/15 | 3/15 | 4/15 | 5/15 | 6/15 | 7/15 |
|---|---|---|---|---|---|---|
| 16QAM | NA | 33.26° | 35.6° | 38.5° | 44.14° | 44.1° |
| 64QAM | 22.96° | 39.36° | 41.26° | 19.01° | 21.17° | 22.49° |
| 256QAM | 36.67° | 40.26° | 19.11° | 22.47° | 8.38° | 11.23° |

| Code Rate/Constellation | 8/15 | 9/15 | 10/15 | 11/15 | 12/15 | 13/15 |
|---|---|---|---|---|---|---|
| 16QAM | 44.49° | 44.49° | 42.1° | NA | NA | NA |
| 64QAM | 22.28° | 22.49° | 22.4° | 19.75° | 18.42° | 16.81° |
| 256QAM | 11.23° | 10.93° | 11.22° | 10.63° | 8.8° | 8.34°. |

2. The method of claim 1, wherein the outward angular region is formed between two boundary lines, the two boundary lines being non-orthogonal to each other.

3. The method of claim 1, wherein the constellation is a non-uniform constellation.

4. The method of claim 1, wherein the plurality of symbols comprises the stream of data that complies with an Advanced Television Standards Committee (ATSC) version 3.0 standard.

5. The method of claim 1, further comprising:
performing a transform on the plurality of symbols, including the at least one symbol having the symbol constellation extension projection, to produce a transform signal; and
modulating the transform signal to produce a transmitting signal.

6. A method for processing a received stream of data represented by a plurality of symbols associated with a constellation, the method comprising:
demodulating the received stream of data to provide an estimation of at least one of the plurality of symbols in the received stream of data on an extended constellation, the extended constellation including at least one extended region formed as an outward angular region, the outward angular region defined by a value of an angle, the value of the angle equal to or less than an angular distance between two symbols in the constellation, wherein the value of the angle is based on the constellation and a code rate used for encoding and transmitting the stream of data according to the following table:

| Code Rate/Constellation | 2/15 | 3/15 | 4/15 | 5/15 | 6/15 | 7/15 | 8/15 | 9/15 | 10/15 | 11/15 | 12/15 | 13/15 |
|---|---|---|---|---|---|---|---|---|---|---|---|---|
| 16QAM | NA | 33.26° | 35.6° | 38.5° | 44.14° | 44.1° | 44.49° | 44.49° | 42.1° | NA | NA | NA |
| 64QAM | 22.96° | 39.36° | 41.26° | 19.01° | 21.17° | 22.49° | 22.28° | 22.49° | 22.4° | 19.75° | 18.42° | 16.81° |
| 256QAM | 36.67° | 40.26° | 19.11° | 22.47° | 8.38° | 11.23° | 11.23° | 10.93° | 11.22° | 10.63° | 8.8° | 8.34°. |

7. The method of claim 6, wherein the outward angular region is formed between two boundary lines, the two boundary lines being non-orthogonal to each other.

8. The method of claim 6, wherein the constellation is a non-uniform constellation.

9. The method of claim 6, wherein the plurality of symbols comprises the stream of data that complies with an Advanced Television Standards Committee (ATSC) version 3.0 standard.

10. The method of claim 6, wherein an indication of use of a two dimensional active constellation extension for the received stream of data is included in the received stream of data.

11. The method of claim 6, wherein an indication of use of a two dimensional active constellation extension for the received stream of data is included in an L1 signaling portion of the received stream of data.

12. An apparatus for processing a received stream of data represented by a plurality of symbols associated with a constellation, the apparatus comprising:
a demodulator for demodulating the received stream of data to provide an estimation of at least one of a plurality of symbols in the received stream of data on an extended constellation, the extended constellation including at least one extended region formed as an outward angular region, the outward angular region defined by a value of an angle, the value of the angle equal to or less than an angular distance between two symbols in the constellation, wherein the value of the angle is based on the constellation used for encoding and transmitting the stream of data according to the following table:

| Code Rate/Constellation | 2/5 | 3/15 | 4/15 | 5/15 | 6/15 | 7/15 | 8/15 | 9/15 | 10/15 | 11/15 | 12/15 | 13/15 |
|---|---|---|---|---|---|---|---|---|---|---|---|---|
| 16QAM | NA | 33.26° | 35.6° | 38.5° | 44.14° | 44.1° | 44.49° | 44.49° | 42.1° | NA | NA | NA |
| 64QAM | 22.96° | 39.36° | 41.26° | 19.01° | 21.17° | 22.49° | 22.28° | 22.49° | 22.4° | 19.75° | 18.42° | 16.81° |
| 256QAM | 36.67° | 40.26° | 19.11° | 22.47° | 8.38° | 11.23° | 11.23° | 10.93° | 11.22° | 10.63° | 8.8° | 8.34°. |

13. The apparatus of claim 12, wherein the outward angular region is formed between two boundary lines, the two boundary lines being non-orthogonal to each other.

14. The apparatus of claim 12, wherein the constellation is a non-uniform constellation.

15. The apparatus of claim 12, wherein the plurality of symbols comprises the stream of data that complies with an Advanced Television Standards Committee (ATSC) version 3.0 standard.

16. The apparatus of claim 12, wherein an indication of use of a two dimensional active constellation extension for the received stream of data is included in the received stream of data.

17. The apparatus of claim 14, wherein an indication of use of a two dimensional active constellation extension for the received stream of data is included in an L1 signaling portion of the received signal stream of data.

\* \* \* \* \*